United States Patent [19]
Yoshida

[11] Patent Number: 5,959,634
[45] Date of Patent: *Sep. 28, 1999

[54] CHARACTER GENERATING SYSTEM EMPLOYING THICKENING OR NARROWING OF CHARACTERS

[75] Inventor: Masayuki Yoshida, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/351,641

[22] Filed: Dec. 7, 1994

[30] Foreign Application Priority Data

Dec. 9, 1993 [JP] Japan .................................. 5-309555
Dec. 9, 1993 [JP] Japan .................................. 5-309556

[51] Int. Cl.$^6$ .................................................... G06T 1/00
[52] U.S. Cl. ......................... 345/467; 345/472; 345/471
[58] Field of Search ........................... 395/150; 345/467, 345/471, 472, 194, 195, 143, 144, 128–30

[56] References Cited

U.S. PATENT DOCUMENTS

| | | | |
|---|---|---|---|
| 4,817,172 | 3/1989 | Cho ........................................... | 382/21 |
| 4,933,866 | 6/1990 | Markoff et al. ......................... | 395/150 |
| 5,050,228 | 9/1991 | Yoshida et al. ......................... | 382/256 |
| 5,274,365 | 12/1993 | Marinez et al. ....................... | 345/128 |
| 5,301,267 | 4/1994 | Hassett ..................................... | 395/150 |
| 5,365,599 | 11/1994 | Seto et al. ................................ | 382/22 |
| 5,475,807 | 12/1995 | Yoshida et al. ......................... | 395/150 |
| 5,499,332 | 3/1996 | Yoshida ................................... | 395/150 |
| 5,501,538 | 3/1996 | Sawada et al. .......................... | 400/304 |
| 5,519,412 | 5/1996 | Watanabe ................................ | 345/128 |
| 5,524,198 | 6/1996 | Matsumoto et al. .................... | 395/157 |
| 5,539,868 | 7/1996 | Hosoya et al. .......................... | 395/151 |
| 5,598,520 | 1/1997 | Harel et al. .............................. | 395/169 |
| 5,673,371 | 9/1997 | Koopman et al. ....................... | 395/110 |
| 5,714,987 | 2/1998 | Otsuka ..................................... | 345/467 |
| 5,754,164 | 5/1998 | Yutani et al. ........................... | 345/143 |
| 5,777,627 | 7/1998 | Takazawa ................................ | 345/469 |

FOREIGN PATENT DOCUMENTS

| | | |
|---|---|---|
| 95536A1 | 12/1983 | European Pat. Off. . |
| 0385269A2 | 9/1990 | European Pat. Off. . |
| 0451125A3 | 10/1991 | European Pat. Off. . |
| 0451425A2 | 10/1991 | European Pat. Off. . |
| 0549256A2 | 10/1991 | European Pat. Off. . |
| 54125A2 | 10/1991 | European Pat. Off. . |

OTHER PUBLICATIONS

Patent Abstracts of Japan, vol. 18, No. 441 (P–1788) Aug. 17, 1994 & JP–A–06 138 865 (Ricoh Co Ltd) May 20, 1994.
Patent Abstracts of Japan, vol. 16, No. 323 (P–1386) Jul. 16, 1992 & JP–A–04 093 992 (Fuji Xerox Co Ltd.) Mar. 26, 1992.
Patent Abstracts of Japan, vol. 014, No. 191 (P–1038), Apr. 18, 1990 & JP–A–02 037391 (Fujitsu Ltd), Feb. 7, 1990.
Patent Abstracts of Japan, vol. 14, No. 581 (P–1147), Dec. 26, 1990 & JP–A–02 250189 (Nippon Joho Kagaku KK). Oct. 5, 1990.

*Primary Examiner*—Joseph H. Feild
*Attorney, Agent, or Firm*—Fitzpatrick, Cella, Harper & Scinto

[57] ABSTRACT

A process and system for generating a character pattern includes the steps of storing character data that consist of coordinate data, generating a character pattern according to the stored coordinate data, determining a parameter to make the character pattern thick or thin, converting the coordinate data according to the determined parameter, and generating a thick or thin character pattern according to the converted coordinate data without changing the frame size of the character pattern.

51 Claims, 34 Drawing Sheets

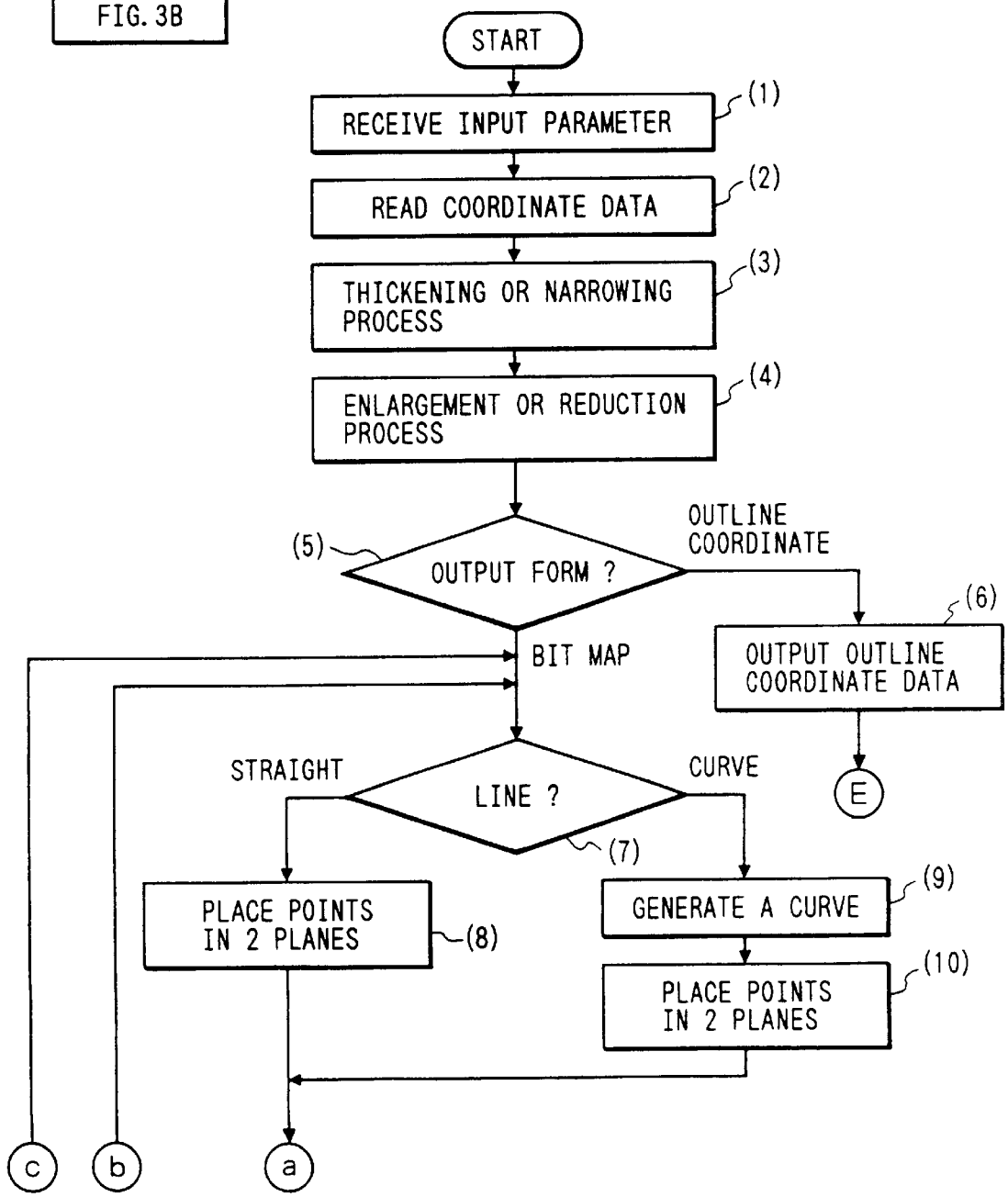

□ END POINTS OF STRAIGHT LINE
○ INTERMEDIATE POINTS OF CURVE

FIG. 6

| NO. OF OUTLINES |
| --- |
| END POINT NO. OF 1ST OUTLINE |
| END POINT NO. OF 2ND OUTLINE |
| ⋮ |
| END POINT NO. OF NTH OUTLINE |
| X0 COORDINATE |
| Y0 COORDINATE |
| ATTRIBUTE OF 0TH POINT |
| X1 COORDINATE |
| Y1 COORDINATE |
| ATTRIBUTE OF 1ST POINT |
| X2 COORDINATE |
| Y2 COORDINATE |
| ATTRIBUTE OF 2ND POINT |
| ⋮ |
| XM COORDINATE |
| YM COORDINATE |
| ATTRIBUTE OF MTH POINT |

STANDARD MING     THICK MING

ROUND GOTHIC THICK ROUND GOTHIC

FIG. 16

| FONT STYLE | MING | | | | ROUND GOTHIC | | | |
|---|---|---|---|---|---|---|---|---|
| | EXTERIOR | | INTERIOR | | EXTERIOR | | INTERIOR | |
| OUTLINE x/y | x | y | x | y | x | y | x | y |
| VERY THIN | 6 | 10 | 5 | 8 | 10 | 10 | 8 | 8 |
| THIN | 9 | 15 | 7 | 13 | 15 | 15 | 13 | 13 |
| STANDARD | 12 | 20 | 10 | 18 | 20 | 20 | 18 | 18 |
| THICK | 15 | 25 | 13 | 23 | 25 | 25 | 23 | 23 |
| VERY THICK | 18 | 30 | 16 | 28 | 30 | 30 | 28 | 28 |

FIG. 23A

| FONT STYLE | MING | | | | | | ROUND GOTHIC | | | | | |
|---|---|---|---|---|---|---|---|---|---|---|---|---|
| OUTLINE/PRESENCE | EXTERIOR | | INTERIOR | | PRESENT | | EXTERIOR | | INTERIOR | | PRESENT |
| x/y | x | y | x | y | | | x | y | x | y | |
| WEIGHT VERY THIN 1 | 3 | 5 | 2 | 5 | | | | | | | |
| THIN 2 | 5 | 10 | 4 | 8 | | | 5 | 5 | 3 | 3 | |
| STANDARD-THIN 3 | 7 | 15 | 6 | 13 | ○ | | 10 | 10 | 8 | 8 | |
| STANDARD 4 | 10 | 20 | 9 | 18 | | | 15 | 15 | 13 | 13 | |
| STANDARD-THICK 5 | 12 | 25 | 11 | 23 | ○ | | 20 | 20 | 18 | 18 | |
| THICK 6 | 14 | 30 | 13 | 28 | | | 25 | 25 | 23 | 23 | ○ |
| VERY THICK 7 | 16 | 35 | 15 | 33 | | | 30 | 30 | 28 | 28 | |
| | | | | | | | 35 | 35 | 33 | 33 | |

FIG. 23B

| FONT STYLE | ANGULAR GOTHIC | | | | | | BLOCK | | | | | |
|---|---|---|---|---|---|---|---|---|---|---|---|---|
| | EXTERIOR | | INTERIOR | | PRESENT | | EXTERIOR | | INTERIOR | | PRESENT | |
| OUTLINE/PRESENCE | | | | | | | | | | | | |
| x/y | x | y | x | y | | | x | y | x | y | | |
| WEIGHT VERY THIN 1 | 5 | 5 | 3 | 3 | | | 3 | 5 | 3 | 5 | | |
| THIN 2 | 10 | 10 | 8 | 8 | | | 6 | 10 | 5 | 8 | | |
| STANDARD-THIN 3 | 15 | 15 | 13 | 13 | | | 9 | 15 | 7 | 13 | | |
| STANDARD 4 | 20 | 20 | 18 | 18 | ○ | | 12 | 20 | 10 | 18 | | |
| STANDARD-THICK 5 | 25 | 25 | 23 | 23 | | | 15 | 25 | 12 | 23 | | |
| THICK 6 | 30 | 30 | 28 | 28 | | | 18 | 30 | 14 | 28 | ○ | |
| VERY THICK 7 | 35 | 35 | 33 | 33 | | | 21 | 35 | 16 | 33 | ○ | |

| 1 | 1 | 1 | 1 |
|---|---|---|---|
| 1 | 1 | 1 | 1 |
| 1 | 1 | 1 | 1 |
| 1 | 1 | 1 | 1 |

| 0.8 | 0.8 | 0.8 | 0.8 |
|---|---|---|---|
| 0.8 | 1.6 | 1.6 | 0.8 |
| 0.8 | 1.6 | 1.6 | 0.8 |
| 0.8 | 0.8 | 0.8 | 0.8 |

| 1.1 | 1.1 | 1.1 | 1.1 |
|---|---|---|---|
| 1.1 | 0.7 | 0.7 | 1.1 |
| 1.1 | 0.7 | 0.7 | 1.1 |
| 1.1 | 1.1 | 1.1 | 1.1 |

$0.8 \times 8 + 1.6 \times 2 = 9.6$
$9.6 \times 15/16 = 9.0$
ACCORDINGLY, GRAY LEVEL = 9

| 0 | 0 | 0 | 0 | 0 | 0 | 0 | 0 | 0 | 0 | 0 |
|---|---|---|---|---|---|---|---|---|---|---|
| 0 | 0 | 10 | 9 | 8 | 8 | 8 | 9 | 13 | 5 | 0 | 0 |
| 0 | 0 | 12 | 3 | 0 | 0 | 0 | 0 | 12 | 4 | 0 | 0 |
| 0 | 0 | 12 | 3 | 0 | 0 | 0 | 0 | 12 | 3 | 0 | 0 |
| 0 | 0 | 12 | 3 | 0 | 0 | 0 | 0 | 12 | 3 | 0 | 0 |
| 0 | 0 | 12 | 9 | 8 | 8 | 8 | 9 | 13 | 3 | 0 | 0 |
| 0 | 0 | 12 | 3 | 0 | 0 | 0 | 0 | 12 | 3 | 0 | 0 |
| 0 | 0 | 12 | 3 | 0 | 0 | 0 | 0 | 12 | 3 | 0 | 0 |
| 0 | 0 | 12 | 3 | 0 | 0 | 0 | 0 | 12 | 3 | 0 | 0 |
| 0 | 0 | 12 | 3 | 0 | 0 | 0 | 0 | 12 | 3 | 0 | 0 |
| 0 | 0 | 12 | 9 | 8 | 8 | 8 | 8 | 12 | 2 | 0 | 0 |
| 0 | 0 | 2 | 1 | 0 | 0 | 0 | 0 | 0 | 0 | 0 | 0 |

FIG. 32

| NO. OF OUTLINES |
| --- |
| OFFSET X TO 1ST OUTLINE |
| OFFSET Y TO 1ST OUTLINE |
| END POINT NO. OF 2ND OUTLINE |
| OFFSET X TO 2ND OUTLINE |
| OFFSET Y TO 2ND OUTLINE |
| ⋮ |
| END POINT NO. OF NTH OUTLINE |
| OFFSET X TO NTH OUTLINE |
| OFFSET Y TO NTH OUTLINE |
| X0 COORDINATE |
| Y0 COORDINATE |
| ATTRIBUTE OF 0TH POINT |
| X1 COORDINATE |
| Y1 COORDINATE |
| ATTRIBUTE OF 1ST POINT |
| X2 COORDINATE |
| Y2 COORDINATE |
| ATTRIBUTE OF 2ND POINT |
| ⋮ |
| XM COORDINATE |
| YM COORDINATE |
| ATTRIBUTE OF MTH POINT |

STANDARD MING    THICK MING

ROUND GOTHIC    THICK ROUND GOTHIC

FIG. 38

| FONT STYLE | MING | | ROUND GOTHIC | |
|---|---|---|---|---|
| x/y | x | y | x | y |
| VERY THIN | 6 | 10 | 10 | 10 |
| THIN | 9 | 15 | 15 | 15 |
| STANDARD | 12 | 20 | 20 | 20 |
| THICK | 15 | 25 | 25 | 25 |
| VERY THICK | 18 | 30 | 30 | 30 |

FIG. 39A

| FONT STYLE | MING | | | ROUND GOTHIC | | |
|---|---|---|---|---|---|---|
| x/y | x | y | PRESENT | x | y | PRESENT |
| WEIGHT VERY THIN 1 | 3 | 5 | | 5 | 5 | |
| THIN 2 | 5 | 10 | | 10 | 10 | |
| STANDARD-THIN 3 | 7 | 15 | ○ | 15 | 15 | |
| STANDARD 4 | 10 | 20 | | 20 | 20 | |
| STANDARD-THICK 5 | 12 | 25 | | 25 | 25 | ○ |
| THICK 6 | 14 | 30 | | 30 | 30 | |
| VERY THICK 7 | 16 | 35 | ○ | 35 | 35 | |

FIG. 39B

| FONT STYLE | ANGULAR GOTHIC | | | BLOCK | | |
|---|---|---|---|---|---|---|
| x/y | x | y | PRESENT | x | y | PRESENT |
| WEIGHT VERY THIN 1 | 5 | 5 | | 3 | 5 | |
| THIN 2 | 10 | 10 | | 6 | 10 | |
| STANDARD-THIN 3 | 15 | 15 | | 9 | 15 | |
| STANDARD 4 | 20 | 20 | | 12 | 20 | ○ |
| STANDARD-THICK 5 | 25 | 25 | | 15 | 25 | |
| THICK 6 | 30 | 30 | ○ | 18 | 30 | |
| VERY THICK 7 | 35 | 35 | | 21 | 35 | ○ |

| 1 | 1 | 1 | 1 |
|---|---|---|---|
| 1 | 1 | 1 | 1 |
| 1 | 1 | 1 | 1 |
| 1 | 1 | 1 | 1 |

| 0.8 | 0.8 | 0.8 | 0.8 |
|---|---|---|---|
| 0.8 | 1.6 | 1.6 | 0.8 |
| 0.8 | 1.6 | 1.6 | 0.8 |
| 0.8 | 0.8 | 0.8 | 0.8 |

| 1.1 | 1.1 | 1.1 | 1.1 |
|---|---|---|---|
| 1.1 | 0.7 | 0.7 | 1.1 |
| 1.1 | 0.7 | 0.7 | 1.1 |
| 1.1 | 1.1 | 1.1 | 1.1 |

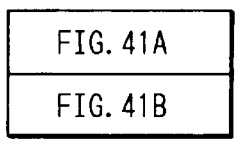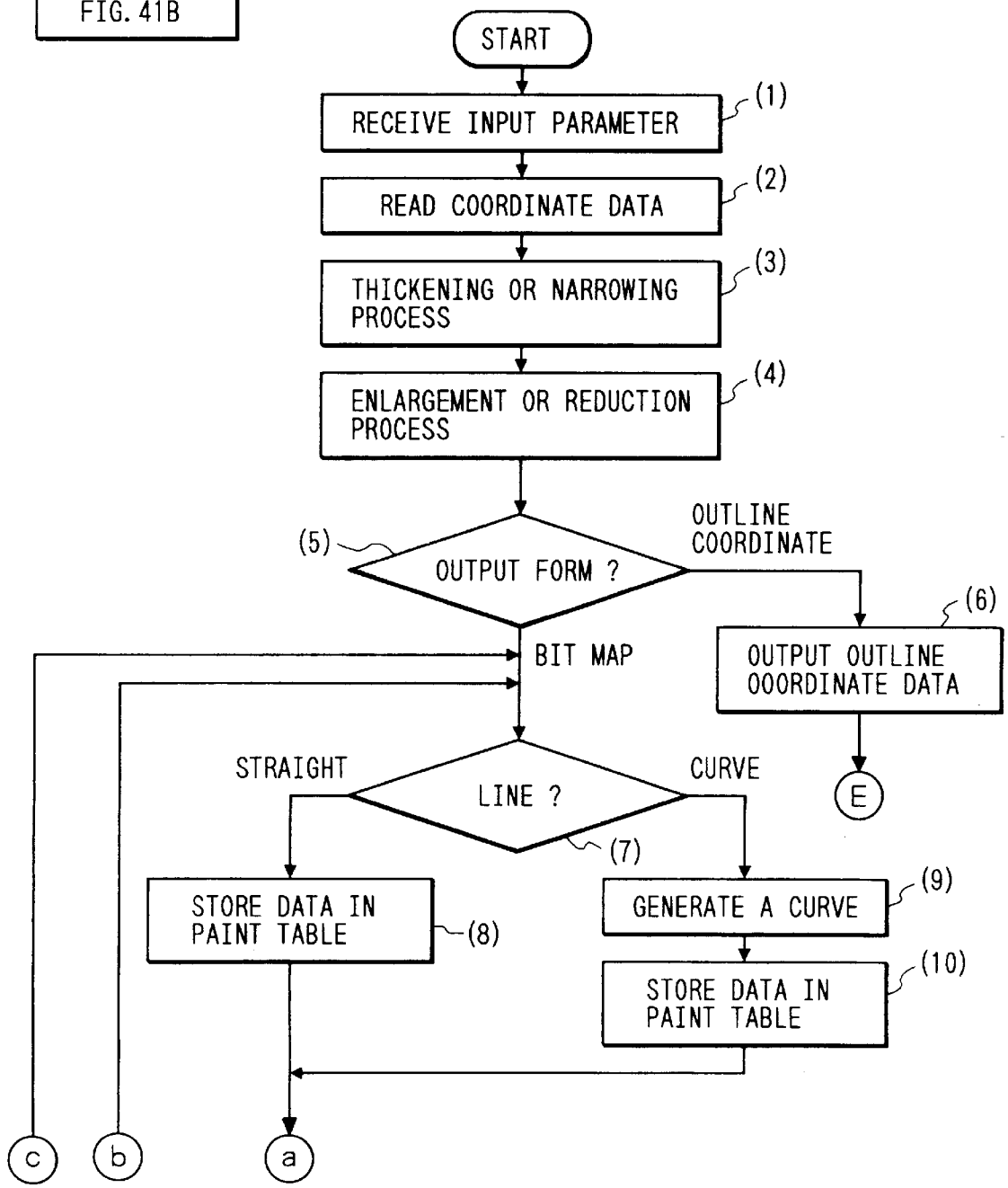

$0.8 \times 8 + 1.6 \times 2 = 9.6$
$9.6 \times 15/16 = 9.0$
ACCORDINGLY, GRAY LEVEL = 9

| 0 | 0 | 0 | 0 | 0 | 0 | 0 | 0 | 0 | 0 | 0 |
|---|---|---|---|---|---|---|---|---|---|---|
| 0 | 0 | 10| 9 | 8 | 8 | 8 | 9 | 13| 5 | 0 | 0 |
| 0 | 0 | 12| 3 | 0 | 0 | 0 | 0 | 12| 4 | 0 | 0 |
| 0 | 0 | 12| 3 | 0 | 0 | 0 | 0 | 12| 3 | 0 | 0 |
| 0 | 0 | 12| 3 | 0 | 0 | 0 | 0 | 12| 3 | 0 | 0 |
| 0 | 0 | 12| 9 | 8 | 8 | 8 | 9 | 13| 3 | 0 | 0 |
| 0 | 0 | 12| 3 | 0 | 0 | 0 | 0 | 12| 3 | 0 | 0 |
| 0 | 0 | 12| 3 | 0 | 0 | 0 | 0 | 12| 3 | 0 | 0 |
| 0 | 0 | 12| 3 | 0 | 0 | 0 | 0 | 12| 3 | 0 | 0 |
| 0 | 0 | 12| 3 | 0 | 0 | 0 | 0 | 12| 3 | 0 | 0 |
| 0 | 0 | 12| 9 | 8 | 8 | 8 | 8 | 12| 2 | 0 | 0 |
| 0 | 0 | 2 | 1 | 0 | 0 | 0 | 0 | 0 | 0 | 0 | 0 |

CHARACTER GENERATING SYSTEM EMPLOYING THICKENING OR NARROWING OF CHARACTERS

BACKGROUND OF THE INVENTION

1. Field of the Invention

The present invention relates to a character generating apparatus that converts characters, etc., that have been coded in vector form into characters that are coded in dot form, and to a method that is employed for effecting the described conversion.

2. Related Background Art

In a conventional apparatus that develops data that are stored in vector form into a bit map and outputs characters, coordinate data that are stored in a ROM, or on a hard disk, are read out and converted into a desired size by multiplying them by a rate of enlargement or reduction. The resultant data are then converted into dot form data to provide character data.

In this case, however, if there are different weights for an identical font style, there must be one set of coordinate data for each weight. For a Japanese font style, where there are about 8000 characters per font style and where the memory capacity for the coordinate data required for each font must be 1M byte to 3M bytes, if coordinate data were provided for each weight, the memory capacity would be enormous.

SUMMARY OF THE INVENTION

To overcome the above shortcoming, it is an object of the present invention to generate different weight data for an identical font style from character data, which consist of a plurality of outline data for at least one font style, so that various weight character data for individual font styles can be produced with a small memory capacity.

The features of the present invention will now be explained.

A character generating apparatus according to the present invention comprises: a storage means for storing character data that consist of coordinate data, a generation means for generating a character pattern according to the coordinate data stored in the storage means, a determination means for determining a parameter to make the character pattern thick or thin, and a conversion means for converting the coordinate data according to the parameter determined by the determination means; and employs the generation means to generate a thick or thin character pattern according to coordinate data converted by the conversion means.

The conversion means of a character generating apparatus according to the present invention determines coordinate data by referring to the coordinate data for two points that are adjacent to the coordinates for a target.

The coordinate data for a character generating apparatus according to the present invention consist of exterior outline data and interior outline data.

The determination means for a character generating apparatus according to the present invention determines a parameter that indicates a large character weight or a small character weight, separately for the exterior outline data and the interior outline data.

The determination means for a character generating apparatus according to the present invention determines the large character weight or the small character weight in directions x and y, separately from the exterior outline data and the interior outline data.

The generation means for a character generating apparatus according to the present invention outputs either a bit map form, an outline coordinate data form, or a gray scale form according to converted outline data.

The other objects and features of the present invention will be apparent from the following specifications and drawings.

BRIEF DESCRIPTION OF THE DRAWINGS

FIG. 6 is a diagram showing coordinate output data for the converted outline font of a character generating apparatus according to the present invention;

FIG. 16 is a diagram of first table data for determining a thickening parameter in a character generating apparatus according to the present invention;

FIGS. 23A and 23B are diagrams showing second table data for determining a thickening parameter in a character generating apparatus according to the present invention;

FIG. 32 is a diagram showing coordinate output data for the converted outline font of a character generating apparatus according to the present invention;

FIG. 38 is a diagram of third table data for determining a thickening parameter with a character generating apparatus according to the present invention;

FIGS. 39A and 39B are diagrams showing fourth table data for determining a thickening parameter with a character generating apparatus according to the present invention;

DESCRIPTION OF THE PREFERRED EMBODIMENTS

First Embodiment

One embodiment of the present invention will now be described. It should be noted that the present invention may be employed by a system that has a plurality of devices or by an apparatus that consists of a single device. The present invention may also be provided by supplying a program to such a system or such an apparatus.

Figure 1:
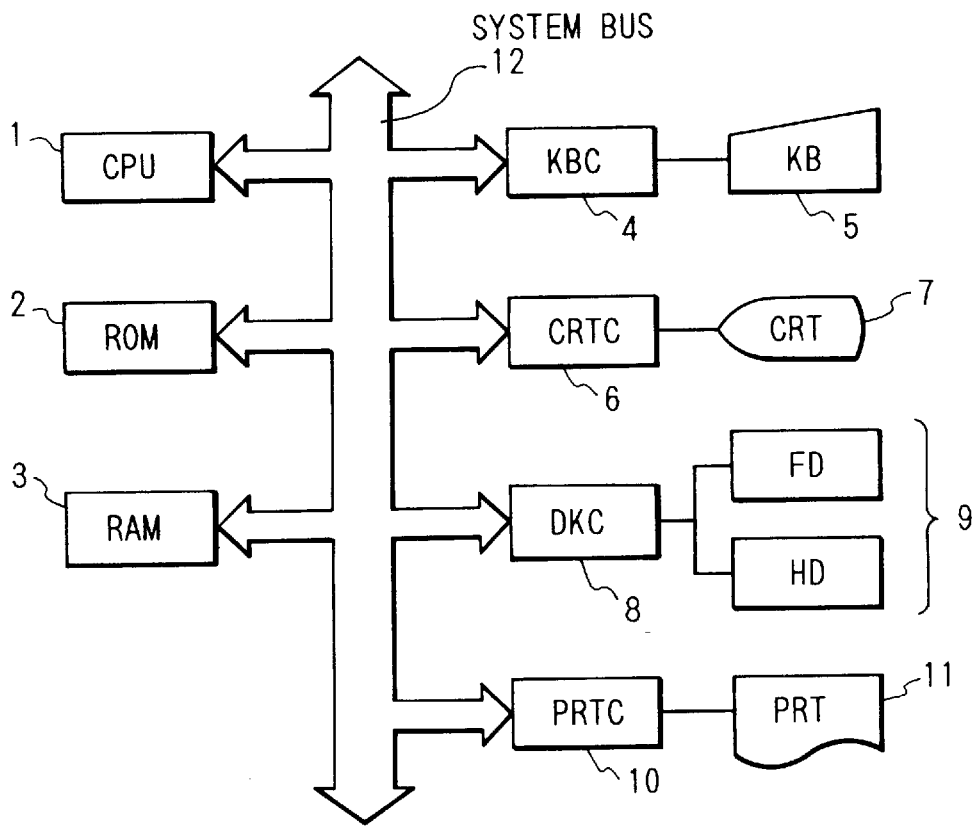
FIG. 1 is a block diagram illustrating a first system for which a character generating apparatus according to the present invention is applicable.

FIG. 1 is a block diagram illustrating the control configuration of a first system, for which a character generating apparatus according to the present invention can be applied. This system may be either a word processor, a work station, or a computer system.

In FIG. 1, a CPU 1 is a central processing unit that controls the entire system and performs arithmetic operations, etc. A ROM 2 is a read only memory where a system activating program, programs relating to flowcharts, which will be described later, and character pattern data are stored. A RAM 3, which is a random access memory, is a data storage area with no usage limits, where various programs and data are loaded and executed for each process. A KBC 4 is a keyboard control section that receives key input data from a KB 5, a keyboard, and transmits the data to the CPU 1. In the ROM 2 are stored such data as are shown in FIGS. 16, 26A, 26B, 38, 42A and 42B, which will be described later.

A CRTC 6 is a display controller that sends data that are to be displayed to a CRT 7, a display unit. Peripheral storage devices 9, such as an FD (floppy disk device) or an HD (hard disk device), are employed to store programs and data, which are referred to, or loaded to the RAM 3, as required during execution. A DKC 8 is a disk controller that controls data transmission. A PRTC 10 is a printer controller, a PRT 11 is a printer device, and a system bus is a data path for the above described components.

Figure 2:
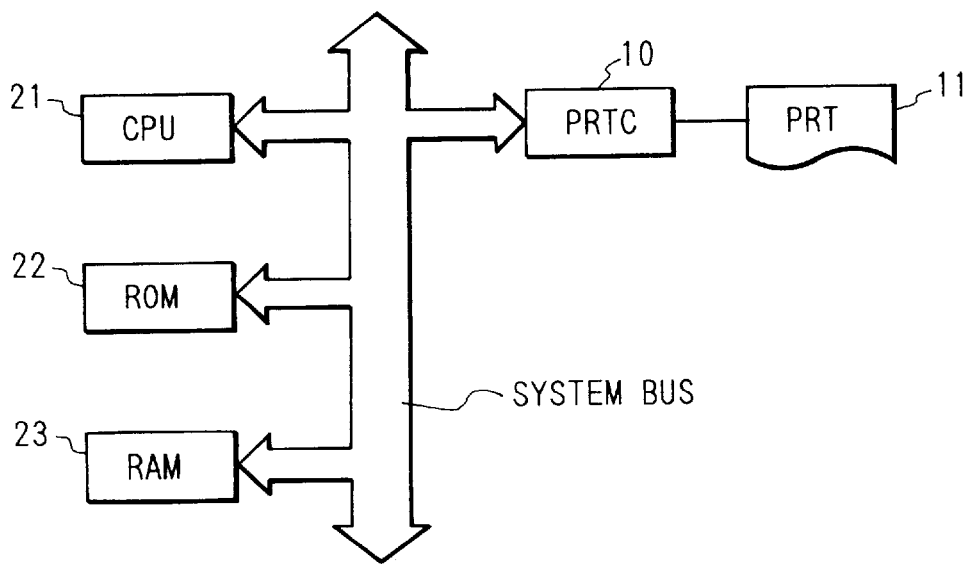
FIG. 2 is a block diagram illustrating a second system for which a character generating apparatus according to the present invention is applicable.

FIG. 2 is a block diagram of the control configuration of a second system, for which a character generating apparatus according to the present invention is applicable. This system may be a laser beam printer, a bubble jet printer, or a thermal transfer unit.

In FIG. 2, a CPU 21 is a central processing unit that controls the entire apparatus and performs arithmetic operations. A ROM 22 is a read only memory where a system activating program, character pattern data, etc. are stored.

A RAM 23, which is a random access memory, is a data storage area with no usage limits where various programs and data are loaded and executed for each process.

A PRTC 10 is a printer controller that transmits data to a PRT 11, a printer, which in turn prints the data.

In such a character generating apparatus, the CPU 1 executes, according to a parameter that indicates a determined character weight, a conversion program that is stored in the ROM 2, and transforms the coordinate values of outline data into other data that will be described later. The CPU 1 then generates a thick or thin character pattern according to the outline data whose coordinates have been transformed, and either a thick character or a thin character that has a different weight is produced by employing relatively little character data.

Further, the CPU 1 determines a transformed coordinate value, by referring to coordinate values of two points that are adjacent to the coordinates of a target, and produces a well balanced thick or thin character pattern.

In addition, the CPU 1 extracts exterior outline data and interior outline data from outline data, and generates a thick or thin character pattern that has a pleasing appearance.

Moreover, the CPU 1 determines a thick character weight and a thin character weight independently, by employing the extracted exterior outline data and interior outline data, and generates a thick or thin character pattern that has a pleasing appearance.

Further, the CPU 1 determines independent character weights for an x direction and a y direction by employing the extracted exterior and interior outline data, and generates a thick or a thin character pattern that effectively depicts the characteristic of each font style.

In addition, according to the converted outline data the CPU 1 outputs either a bit mapped font, outline coordinate data, or a gray scale font, and supplies thick or thin character data in an appropriate data form to various output means.

Moreover, in accordance with a parameter that indicates a determined character weight, character data that the CPU 1 will convert is determined from a table, which is stored in the ROM 2, and the coordinate values of the outline data, which correspond to the determined character data, are transformed. In accordance with the outline data whose coordinates are transformed, a thick or thin character pattern is generated, so that the character data source is utilized to produce the most preferred thick or thin character data.

Also, the CPU 1 generates more strict thick or thin character data by converting character data that have a character weight which is close to a determined character weight.

The detailed processing of the embodiment of the present invention will now be explained while referring to the flowchart in FIGS. 3A and 3B.

Figure 3B:
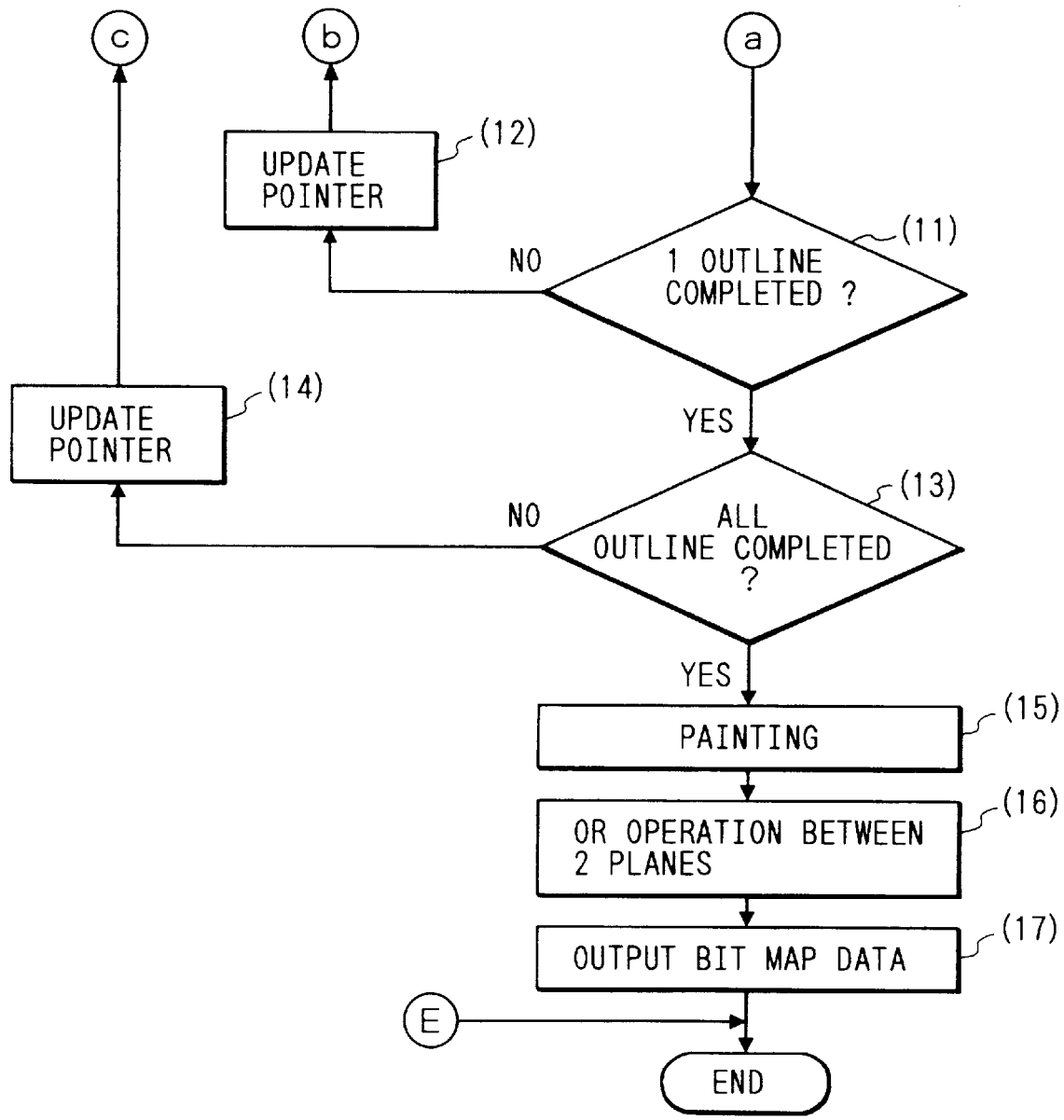
FIG. 3 is comprised of FIG. 3A and FIG. 3B showing flowcharts of a first character generating method for a character generating apparatus according to the present invention.

The flowchart in FIGS. 3A and 3B show the first character generating method for a character generating apparatus according to the present invention. The numbers (1) through (17) indicate the steps of the procedure.

An explanation will be given that involves the use of the data for one font style, which is present in a system and which has a specific weight, to generate data for characters that have a different weight.

Input parameters are received at step (1).

The input parameters may be, for example, a character code, a font style, weight data, and a character output size and form that is to be output.

The character codes are determined by a character code system, such as the JIS codes, the shift JIS codes, the EUC codes, or the UNI codes, by which a target system is specified in advance.

The font style is selected from data that the system incorporates in advance, such as Ming, Gothic, or Round Gothic, or data that are added as options. A weight is data for the line thickness of the font style, and the data "very thin", "thin", "standard", "thick", and "very thick" are provided.

The output size is data that indicate the actual size of the font data that are to be output.

The output form is the output data form for a desired font, and an output request, such as an outline coordinate data output or a bit mapped output, is issued.

The coordinate data for a target character are read at step (2). The data are stored in advance in the ROM, in the RAM, on a hard disk, or on a floppy disk. The font style data and character code data of the data fetched at step (1) are examined, and the required amount of coordinate data are read.

Figure 4:
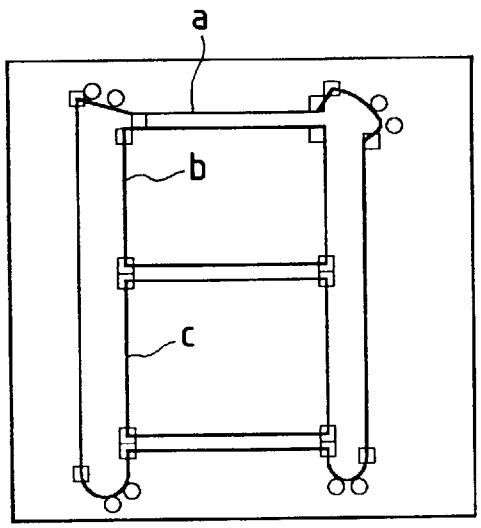
FIG. 4 is a specific diagram showing the configuration of an outline font before being converted by a character generating apparatus according to the present invention.

The coordinate data that are to be read are data that are obtained by extracting the characteristic points of the outline of a character, as is shown in FIG. 4. The data include attribute information, such as a straight line data/curve data determination flag and an outline start point/end point flag, for each coordinate point.

Although an interpolation expression for curve data employed in this embodiment can be the second or the third B spline curve, or the second or the third Besier curve, the interpolation expression to be employed is determined in advance.

The minimum value of the coordinates that indicate a character frame is "0", and the maximum value is "800".

At step (3), a thickening or a narrowing process is performed for the coordinate data in consonance with the weight data included in the input parameters.

Figure 5:
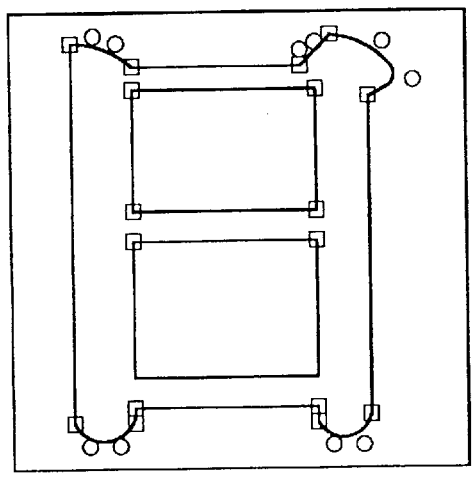
FIG. 5 is a specific diagram showing the configuration of an outline font after being converted by a character generating apparatus according to the present invention.

The details of this process will be described later while referring to the flowchart in FIG. 12. As the result of this process, the coordinate data are transformed into those for a thickened or a narrowed outline, as is shown in FIG. 5.

After the thickening or the narrowing process is performed, the coordinate points have a one to one correspondence, and the attribute flags for each point do not vary.

At step (4) an enlargement or a reduction process is performed for the thickened or the narrowed coordinate data, which are obtained at step (3), in consonance with the output size that was included as an input parameter.

When a requested output size is (Ax, Ay), the coordinate values obtained at step (3) are (x, y), the coordinate values after the enlargement or reduction process is performed are (X, Y), and a stored character frame size is (Mx, My), then $(X, Y)=(x \times Ax/Mx, y \times Ay/My)$.

All the coordinates for a single character are calculated using the above expression. The attribute flags for each of the coordinate points, which are obtained at step (3), do not vary.

When a bit mapped output is requested at step (5), program control advances to step (7).

Steps (7) through (13) are the procedures for actually preparing bit mapped data from coordinate data. At step (7) a check is performed to determine whether the target coordinate data are straight line data or curve data. When, at step (7), the coordinate data are straight line data, the coordinate point is defined as the start point for a straight line, and the following coordinate point is defined as the end point for the straight line. Program control then moves to step (8).

When, at step (7), the target data are curve data, the coordinate data for points between the coordinate point and the point where the curve end flag is placed are assumed to be curve data. Program control then moves to step (9).

Figure 7:
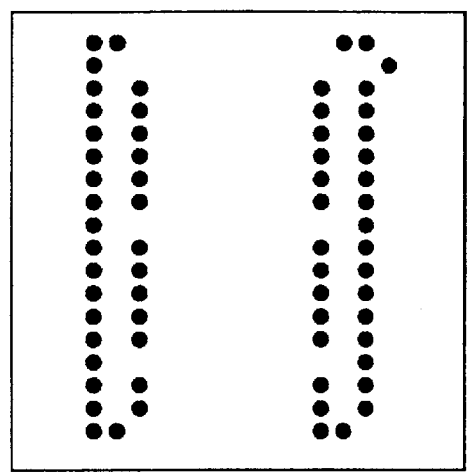
FIG. 7 is a specific diagram showing the point painted state in a character generating apparatus according to the present invention.

A process for generating a straight line is performed at step (8). In this case, a Digital Differential Analyzer" (DDA)

method is employed to generate a straight line. Points are placed in two planes. One plane is used for painting, and, as is shown in FIG. 7, each point is placed at only one x coordinate that corresponds to one y coordinate because lines are scanned from left to right for painting, and an interval between "1" at an odd numbered position through "1" at an even numbered position is painted with "1". If points are placed at more than one X coordinate for a corresponding Y coordinate, painting will not be well performed.

Figure 8:
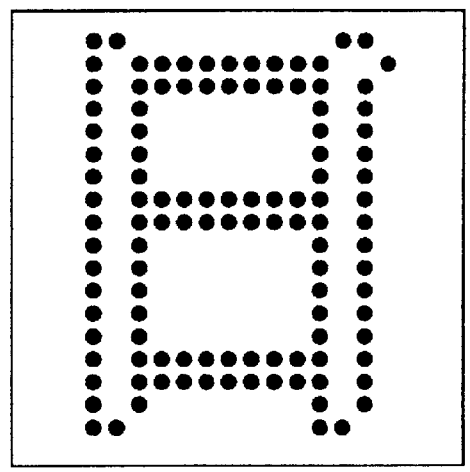
FIG. 8 is a specific diagram showing the outline OR points in a character generating apparatus according to the present invention.

The other plane is an outline OR plane. As is shown in FIG. 8, all the X coordinates for a single Y coordinate are set to "1" in this plane because this outline OR plane is employed to compensate for the bits that are skipped in the painting plane.

At step (9), a process where curve data are transformed into an assemblage of short straight lines (short vectors) is performed.

Figure 9:
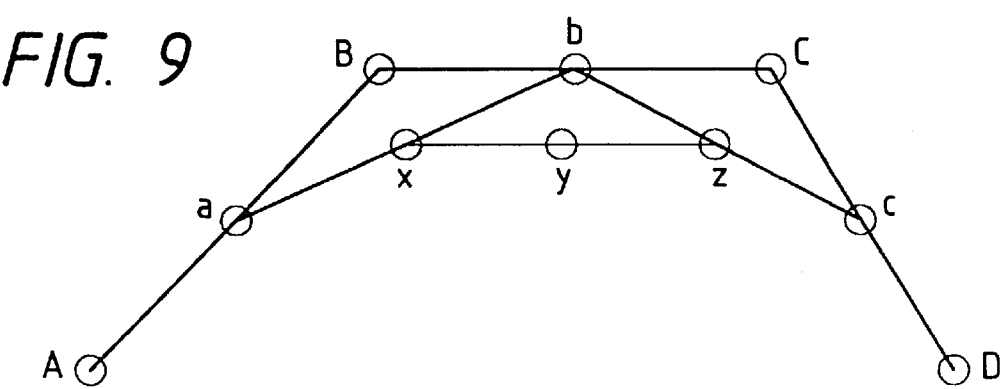
FIG. 9 is a diagram showing the conversion into a short vector assemblage of a third Besier curve in a character generating apparatus according to the present invention.

FIG. 9 illustrates the conversion of a third Besier curve into an assemblage of short vectors.

In FIG. 9, points A, B, C, and D are curve data (third Besier curve points) obtained at step (3) after coordinate transformation. These points are employed to calculate points a, b, and c. Point a is at the mid point between points A and B, point b is at the mid point between points B and C, and point c is at the mid point between points C and D.

Then, points x, y, and z are calculated. Point x is at the mid point between points a and b, point z is at the mid point between points b and c, and point y is at the mid point between points x and z. Thus, the point row Aaxy is a new third Besier curve point, and the point row yzcD is another third Besier curve point.

When these Besier curve points are divided in the same manner but in more detail and satisfy a specific determination reference, the division process is halted. The third Besier curve point rows thus obtained are the assemblage of short vectors.

At step (10) points are placed in two planes according to the short vector assemblage that is acquired at step (9). The method of placing points in the two planes is the same as that which was performed at step (8). This process is repetitively performed for all the short vectors.

A check is performed at step (11) to determine whether the processing for all the coordinate data for one outline has been completed. If the processing has been completed, program control advances to step (13). If the process has not yet been completed, program control moves to step (12).

At step (12) a pointer for current coordinate data is updated to process the next data. If the next data are straight line data, a pointer is updated to point to the next coordinate data. If the next data are curve data, a pointer is updated to point to a curve end coordinate point. Program control then returns to step (7), where a check is performed to determine whether or not the data are for a straight line or for a curve, and points are placed according to the data.

A check is performed at step (13) to determine whether or not all the outline data for one character have been processed. When all the outline data have been processed, program control advances to step (15). When the processing has not been completed, program control moves to step (14).

Since the data for one outline have been processed, a pointer is shifted to point to the head of the next outline at step (14), and program control returns to step (7).

Figure 10:
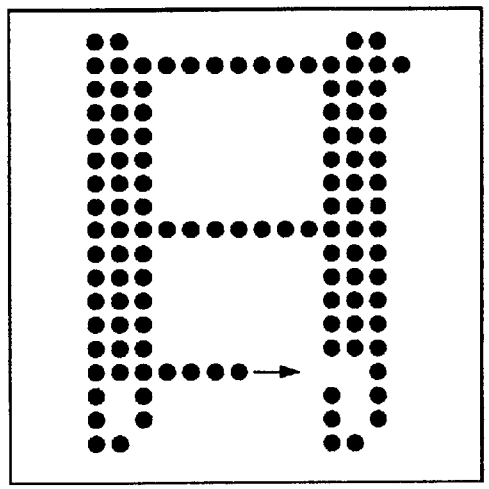
FIG. 10 is a specific diagram showing a painted state in a character generating apparatus according to the present invention.

At step (15), since the process of placing points in the two planes for all the coordinate data has been completed, the plane for painting is scanned from the left along each scanned line, as is shown in FIG. 10, and the interval between the odd numbered "1" through the even numbered "1" is painted with "1".

Figure 11:
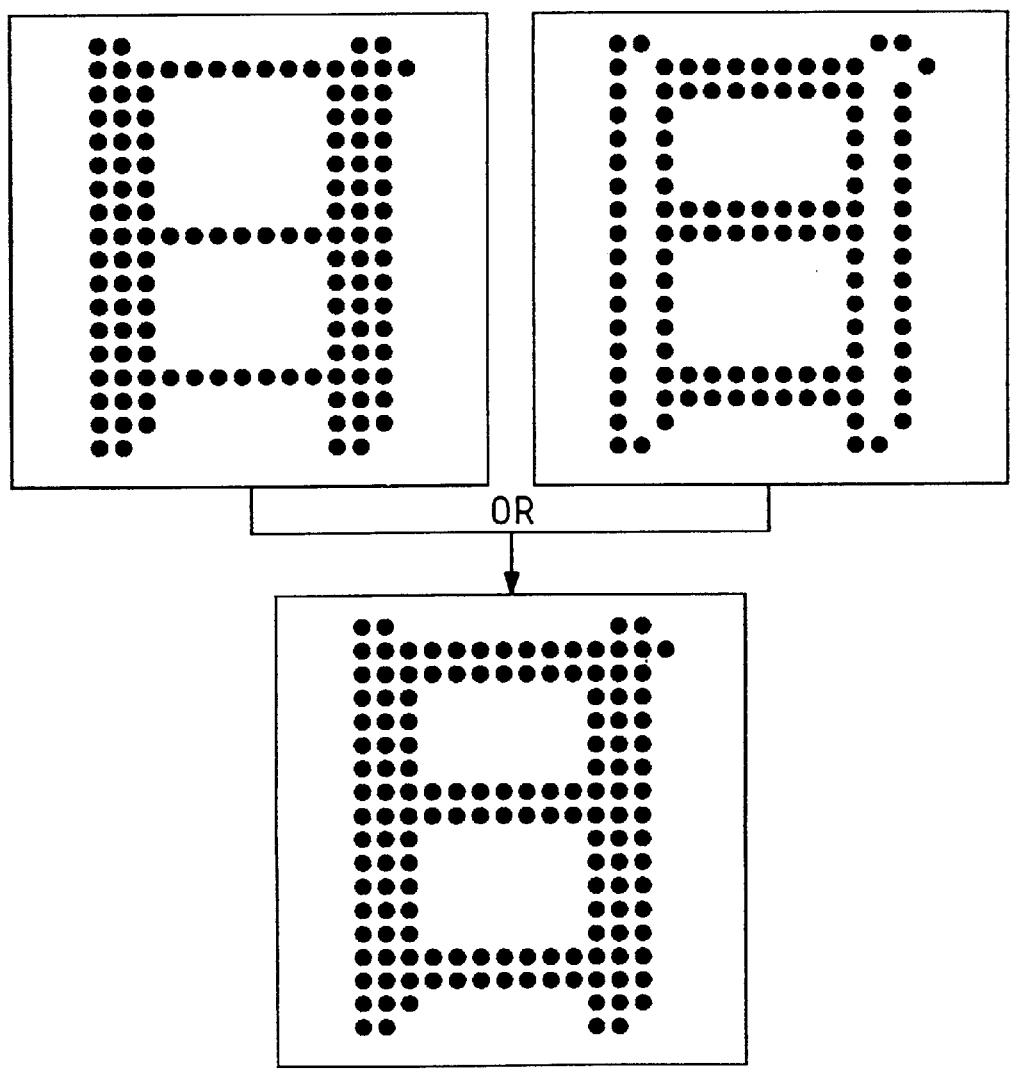
FIG. 11 is a diagram showing a bit mapped font generating process in a character generating apparatus according to the present invention.

The painting process is performed for all the scanned lines. Then, at step (16), as is shown in FIG. 11, the data for the painting plane, obtained at step (15), and the data for the outline OR plane, obtained at steps (8) and (10), are ORed, and the bit mapped data for one character is completed.

Finally, at step (17), data for one character, which is acquired at step (16), are returned to an area that is designated by a request side, and the process is thus terminated.

The thickening/narrowing example process at step (3) in FIG. 3 will now be described in detail, while referring to the flowchart in FIG. 12.

Figure 12:
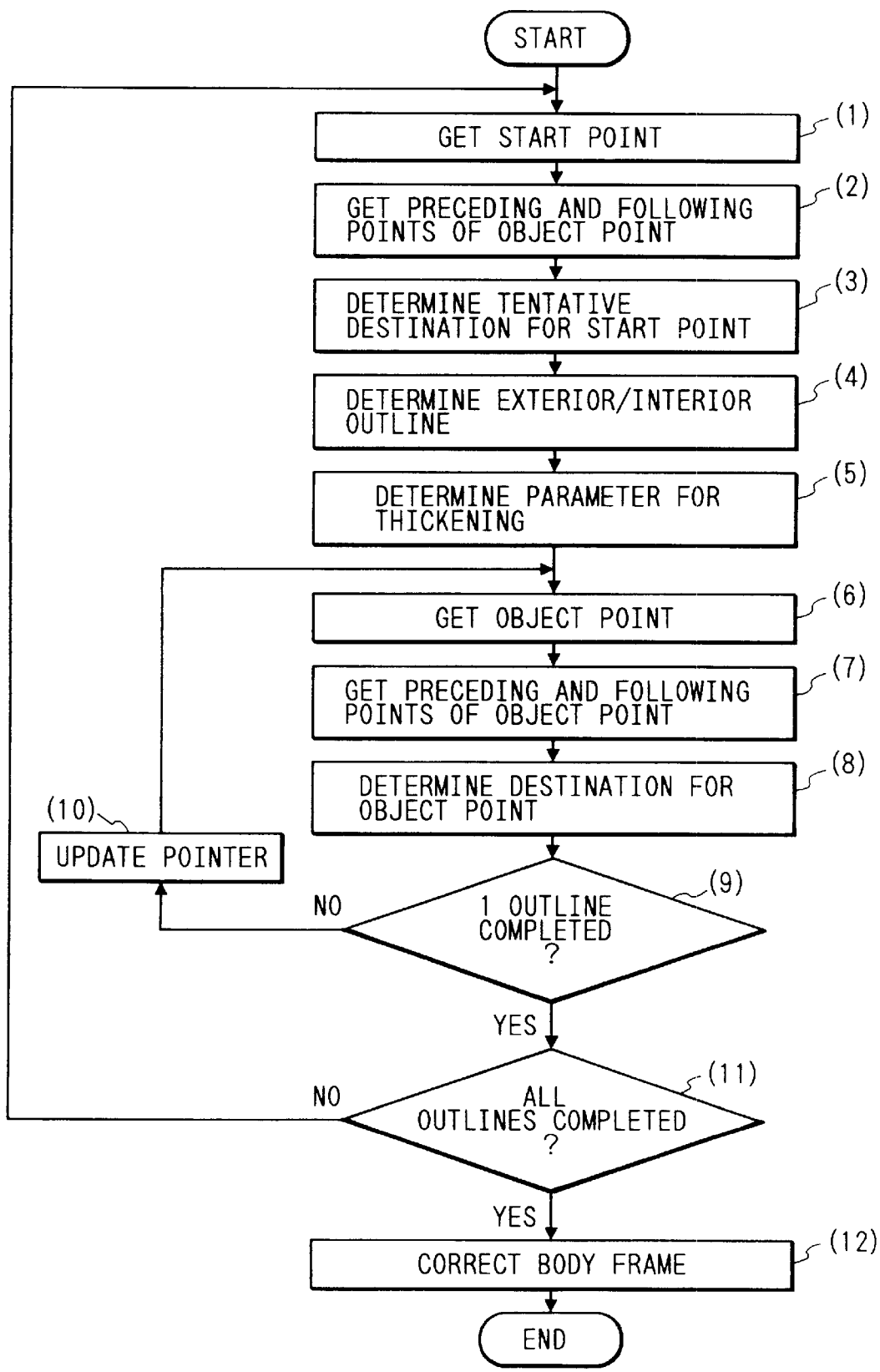
FIG. 12 is a flowchart showing a thickening/narrowing procedure example for a character generating apparatus according to the present invention.
Figure 13:
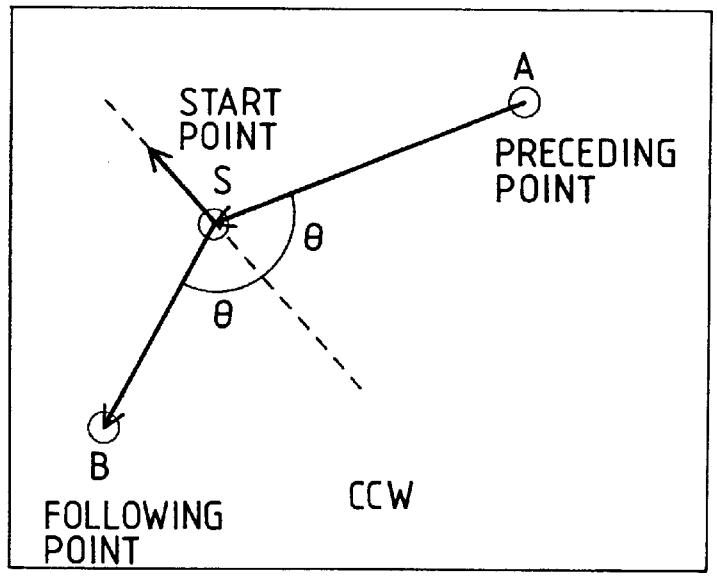
FIG. 13 is a diagram showing preprocessing for determining an exterior outline or an interior outline in a character generating apparatus according to the present invention.

FIG. 12 is a flowchart showing an example thickening/narrowing procedure for a character generating apparatus according to the present invention. The numbers (1) through (12) indicate the steps of the procedure.

In the thickening/narrowing process in this embodiment, a thickening/narrowing parameter is varied according to the exterior outline a and the interior outlines b and c, as is shown in FIG. 4. As the outline coordinate point rows are not distinguished for the exterior outline and for the interior outlines, the coordinate rows are examined and determined to be either for the external outline or for the interior outlines. To change the outline coordinates, an exterior outline thickening/narrowing parameter is employed for the exterior outline coordinates, while an interior outline thickening/narrowing parameter is employed for the interior outline coordinates.

It should be noted that when the exterior outline point row that forms an outline is counterclockwise, the interior outline point rows are arranged clockwise. When the exterior outline point row is clockwise, the interior outline point rows are arranged counterclockwise.

With respect to FIG. 12, at steps (1) through (3) at preprocessing is performed to determine whether a target outline that is to be processed at step (4) is an exterior or an interior outline.

During this process, a start point and two points that are adjacent to the start point are extracted. When the start point is AS, a point preceding the start point (the final point of an outline) is A, and a point following the start point is B; a point for the preprocessing is provided in a direction where an angle formed by the vectors AS and SB is divided.

When the exterior outline point row is counterclockwise, the start point is shifted, by a specific value, to the right when facing in the direction in which the vector is traveling. When the exterior outline point row is clockwise, the start point is shifted, by a specific value, to the left when facing in the direction in which the vector is traveling.

Program control then advances to step (4), where a check is performed to determine whether a target outline is an exterior outline or an interior outline by employing the point for the preprocessing, which is obtained at step (3). The processing at this step will be explained in detail while referring to the flowchart in FIG. 19.

Then, at step (5) parameters for the thickness of the exterior and interior outlines are determined in consonance with a weight value. A parameter for determining the outline thickness has independent values in the x direction and the y direction for the exterior and interior outlines, and manages the thickening of horizontal lines and of vertical lines separately.

Figure 14:
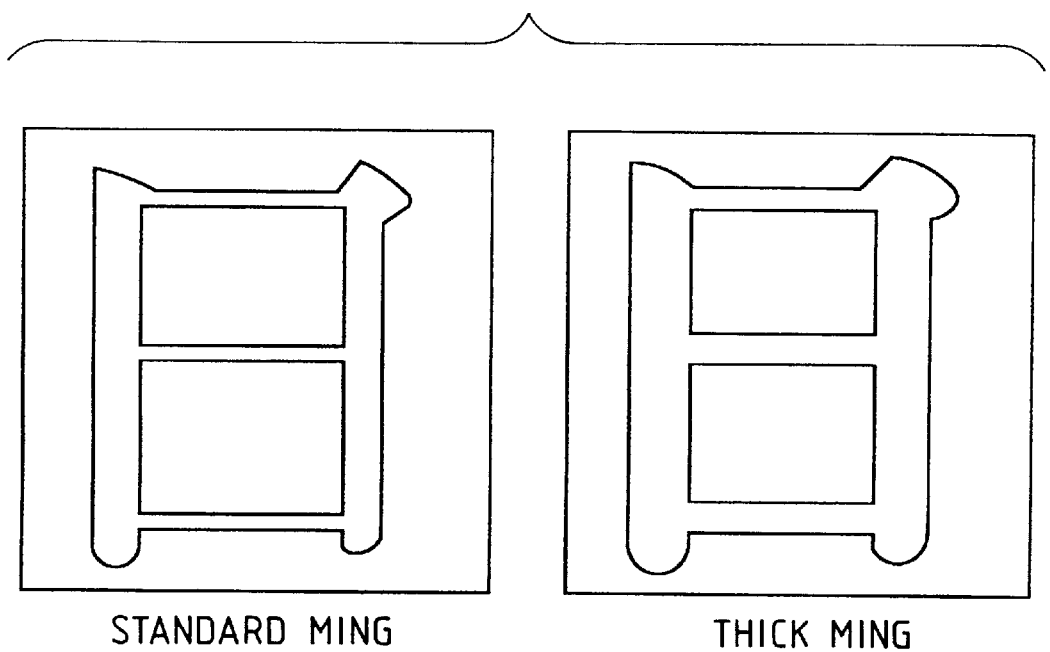
FIG. 14 is a diagram showing the results of the Ming thickening process in a character generating apparatus according to the present invention.

This is because to thicken a Ming character, for example, as is shown in FIG. 14, its horizontal lines need not be thickened much while its vertical lines must be thickened a great deal, and therefore different values are required for the x direction and the y direction.

Figure 15:
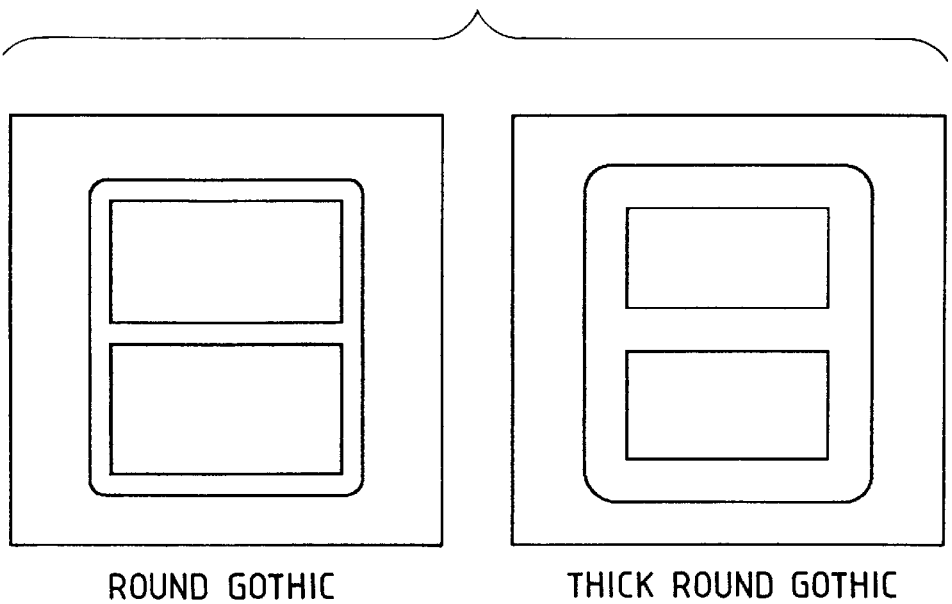
FIG. 15 is a diagram showing the results of the Gothic thickening process in a character generating apparatus according to the present invention.

For round Gothic font style characters, however, the lines in the horizontal direction are thickened as much as those in the vertical direction, as is shown in FIG. 15.

Therefore, the thickening values for the individual font styles have to be changed. As is shown in FIG. 16, data that indicate reference values from an exterior outline and an interior outline to the centers of the horizontal and the vertical lines of font styles and weights are entered in advance in a table (prepared by writing data from the ROM 2 or 22, or from another storage medium to the RAM 3 or 23). The difference between a standard font weight and a desired font weight is employed to determine the thickening of the exterior outline and the interior outlines in the x direction and the y direction. For the Ming style that employs coordinate data for narrowing as standard data, to generate a thick Ming character, a thickening value (parameter) is determined by ascertaining the difference between 15 and 9 for the x component of the exterior outline and the difference between 25 and 15 for its y component.

When the thickening value is positive, the thickening process is performed, while when the thickening value is negative, the narrowing process is performed. During the procedures at steps (6) through (10), the thickening/ narrowing process is performed for all the coordinate point rows that constitute one outline.

First, at step (6), an object point to be processed is fetched. Then, at step (7), points adjacent to the object point are fetched. Finally, at step (8), the thickening process is actually performed.

Figure 17:
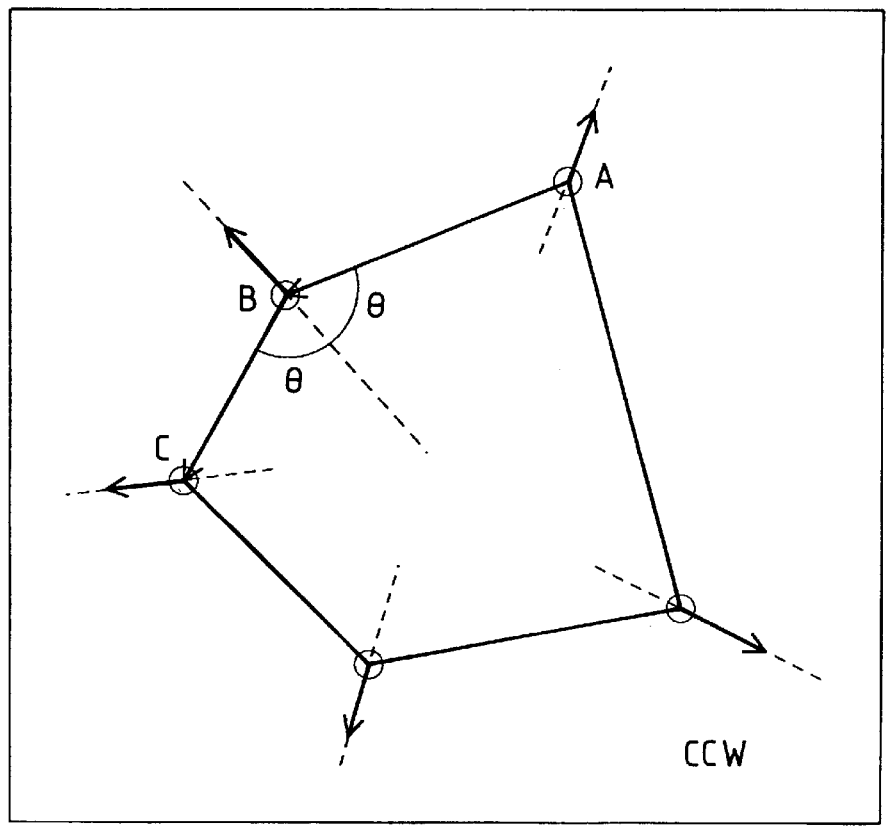
FIG. 17 is a specific diagram showing an exterior outline thickening process in a character generating apparatus according to the present invention.

Suppose that, as is shown in FIG. 17, an object point is B, the preceding point is A, and the following point is C. When the exterior outline is counterclockwise, the object point is shifted to the right relative to a line bisecting an angle formed by the vectors AB and BC. When the exterior outline is clockwise, the object point is shifted to the left. The range within which the point is shifted is equivalent to the hypotenuse of a triangle that is formed with the x thickening value and the y thickening value that are obtained at step (5).

When, at step (9), all the coordinate points for one outline have been processed, program control advances to step (11). When there are some outline points to be processed, program control moves to step (10), where a pointer is updated to point to the next outline point, and the thickening process is performed again.

A check is performed at step (11) to determine whether or not all the outlines for one character have been processed. When the processing has been completed, program control moves to step (12). When there are outlines that remain to be processed, a pointer is updated to point to the next outline point, and the thickening process is performed again.

Figure 18:
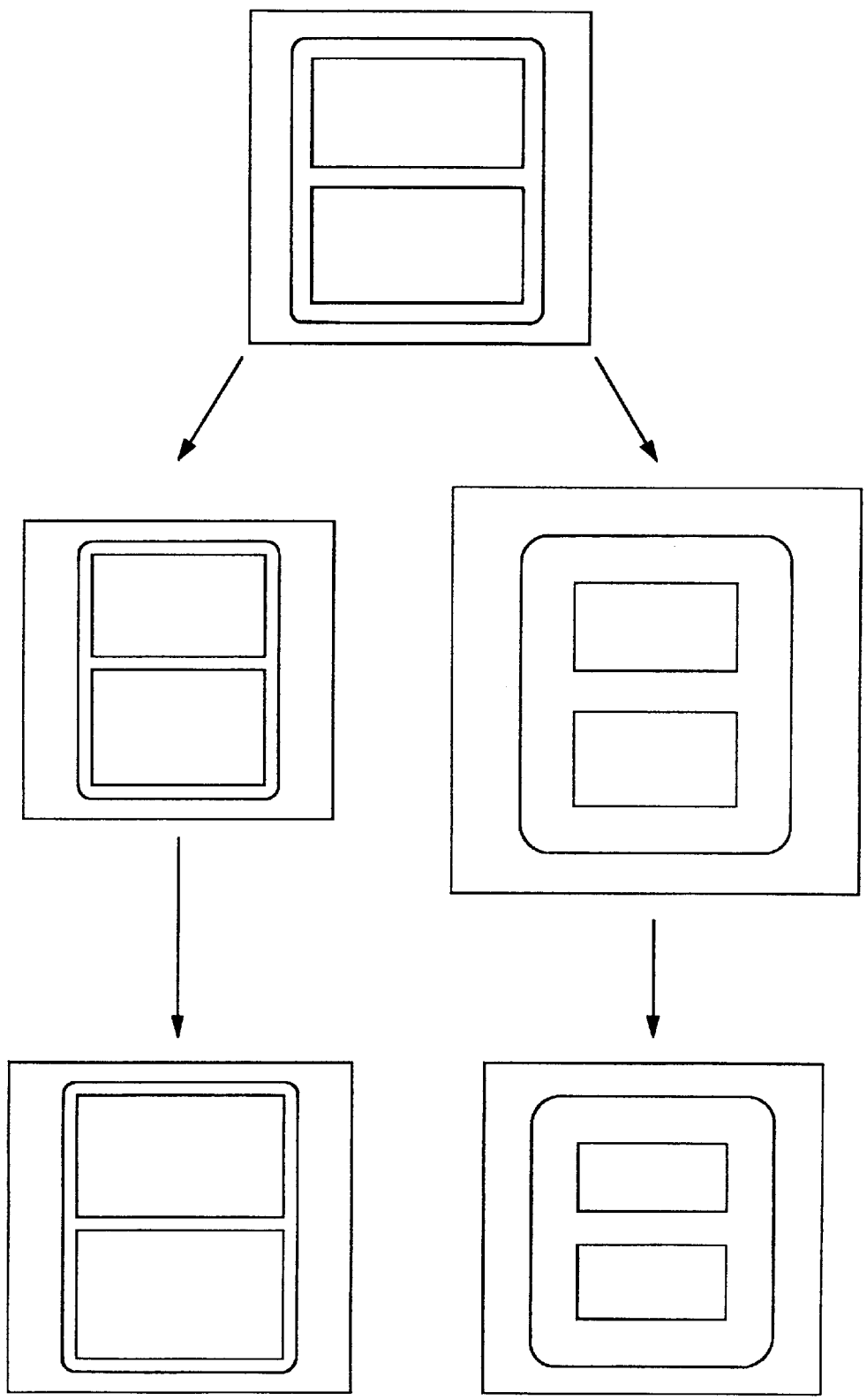
FIG. 18 is a diagram showing the correction of a frame size accompanied with the thickening or narrowing process in a character generating apparatus according to the present invention.

When the thickening process has been performed for all the outline coordinate points, program control goes to step (12). As is shown in FIG. 18, while the thickening process has been performed, the resultant character frame is larger, while when the narrowing process has been performed, the resultant frame is smaller.

Thus, at step (12), it is necessary for the size of the resultant frame to be adjusted to conform to the size of the original character frame. The rate of enlargement/reduction is twice the thickening value for the exterior outline (a negative thickening value for the narrowing), which was acquired at step (5).

When the X width of the original character frame is Bx, the horizontal thickening value of the exterior outline is Fx, the Y width is By, the vertical thickening value of the exterior outline is Fy, the coordinates for which the thickening process is performed are (x, y), and the coordinates after the character frame size has been adjusted are (X, Y), $$(X, Y) = ((x+Fx) \times Bx/(Bx+Fx \times 2), (y+Fy) \times By/(By+Fy \times 2)).$$

This calculation is performed for all the coordinate point rows for one character, and the thickening process shown in FIG. 10 is thus terminated.

The exterior/interior outline determining process at step (4) in FIG. 12 will now be explained in detail while referring to the flowchart in FIG. 19.

Figure 19:
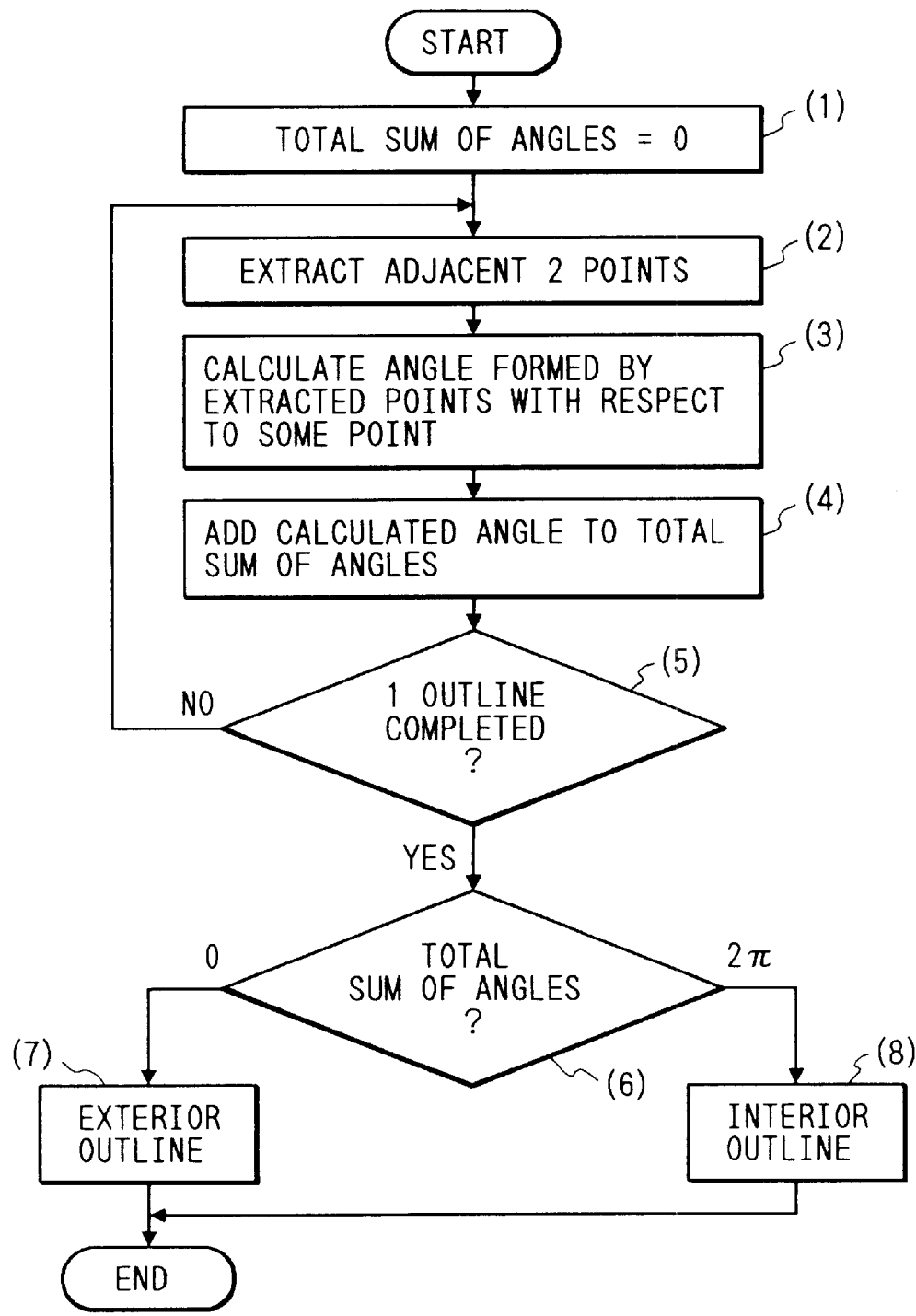
FIG. 19 is a flowchart showing a procedure example for determining an exterior/interior outline for a character generating apparatus according to the present invention.

The flowchart in FIG. 19 is an example procedure for determining an exterior/interior outline for a character generating apparatus according to the present invention. The numbers (1) through (8) represent the steps of the procedure.

Figure 20:
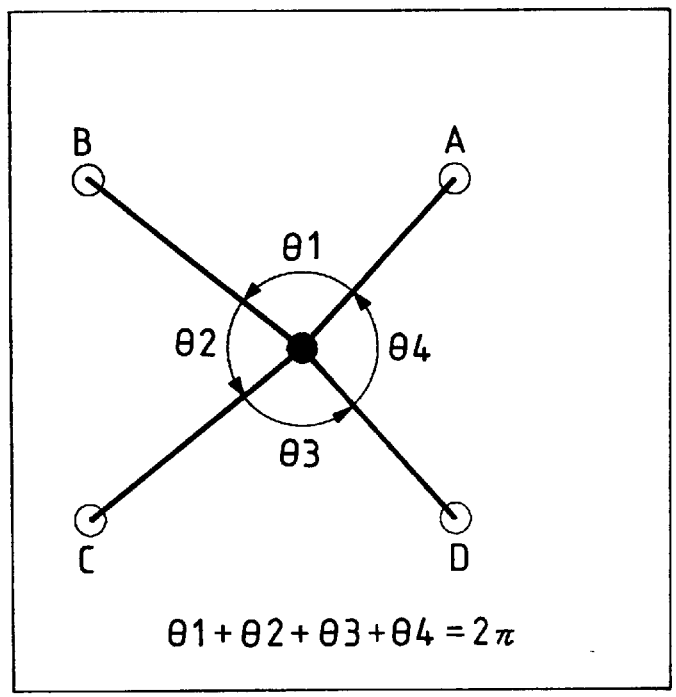
FIG. 20 is a schematic diagram for explaining a process for determining an interior outline characteristic for a character generating apparatus according to the present invention.
Figure 21:
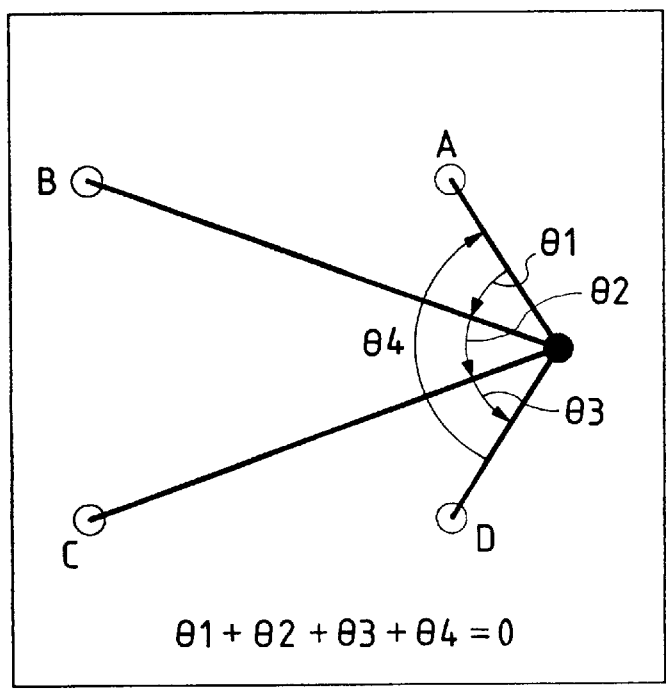
FIG. 21 is a schematic diagram for explaining a process for determining an exterior outline characteristic for a character generating apparatus according to the present invention.

As is shown in FIG. 20, a counterclockwise angle that is formed by connecting two of the outline coordinate points ABCD at a specific point is defined as a positive value; and when the sum of the angles for the points is $2\pi$, these points are determined to be for the interior outline.

When the calculation is performed in the same manner as is performed in FIG. 20 and the sum of the angles is "0", the points are determined to be for the exterior outline. Since the specific point is already calculated at steps (1) through (3) in FIG. 12, the process of calculating the sum of the angles formed with the specific point is performed as is indicated by the flowchart in FIG. 19.

Initialization is performed with the sum of the angles equal to "0" at step (1). Two adjacent points are extracted at step (2). At step (3), the specific point and the two extracted points are connected by vectors and the size of the angle between the vectors is determined. Supposing that the specific point is X and the two extracted points are A and B, the angle can be calculated by the outer product expression. The result is added to the sum of the angles at step (4).

A check is then performed at step (5) to determine whether or not one outline extraction for two points has been completed. When the calculation has been performed for all the points, program control goes to step (6). When there are data that remain to be calculated, program control returns to step (2) to repeat the calculation. A check is performed at step (6) to determine whether the sum of the angles is "0" or "$2\pi$". When the sum is "0", program control moves to step (7) where an external outline flag is set and the process is thereafter terminated. When the sum is "$2\pi$", program control moves to step (8) where an interior outline flag is set and the process is thereafter terminated.

Second Embodiment

Another embodiment will now be described.

An explanation will be given for a case where, when a font style with a specific weight is requested, there are two or more weights that can be employed as standards for the same font style. In this case the selection, from among a plurality of font weights for the same font style, of the font weight that is to be used to process a requested weight is important.

When the font style that has a standard weight is determined, the following weight conversion process is performed in the same manner as it is performed for the first embodiment. An explanation will thus be given only for a method of selecting a weight as a standard.

Figure 22:
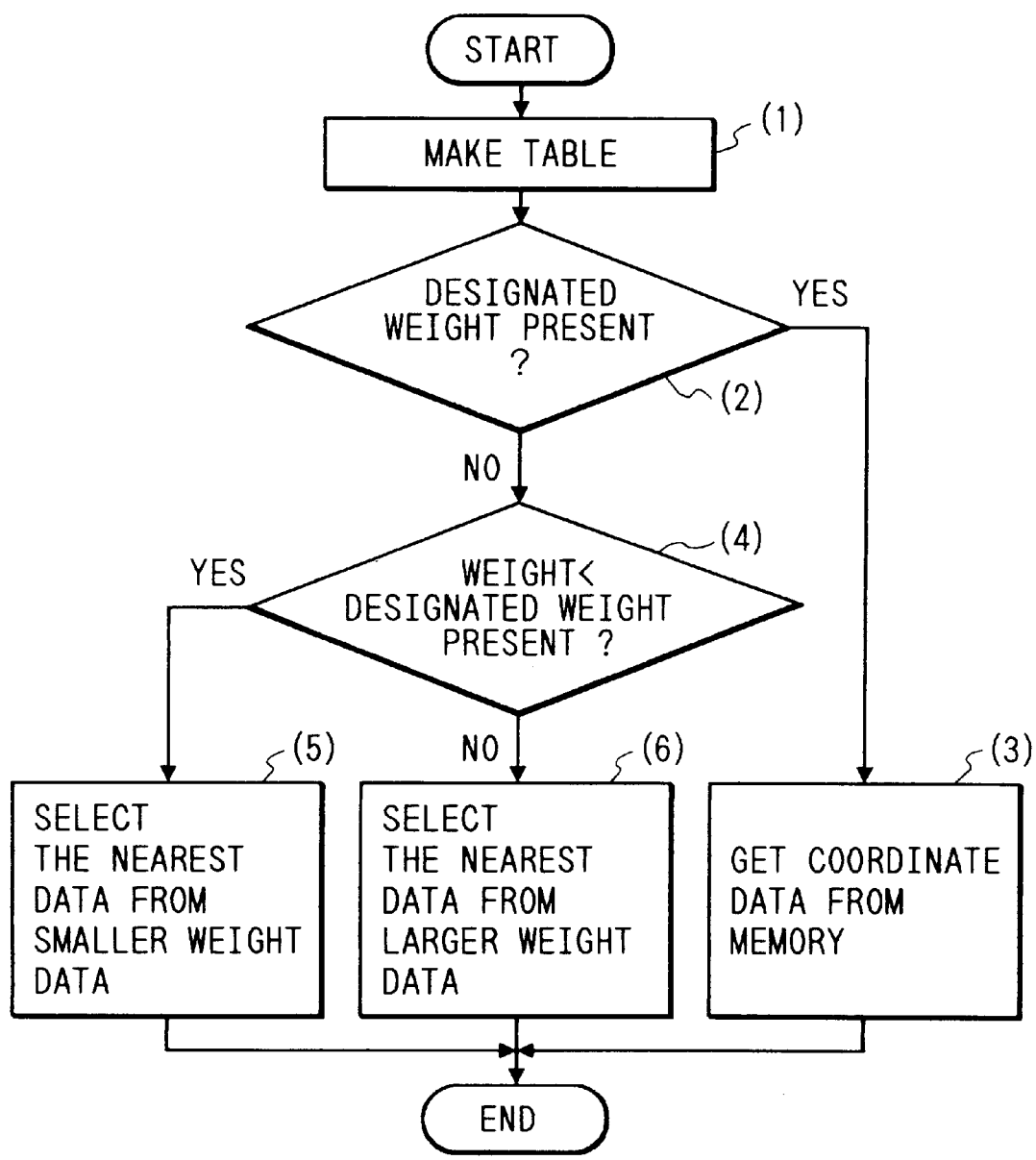
FIG. 22 is a flowchart showing a procedure example for selecting a thickening parameter for a character generating apparatus according to the present invention.

FIG. 22 is a flowchart showing an example procedure for selecting a thickening parameter for a character generating apparatus according to the present invention. The numbers (1) through (6) represent the steps of the procedure.

First, it is necessary at step (1) to examine which weights of which font styles are stored in a storage device. Header data that are stored in the headers for the font styles are referred to, and data that indicate the presence of such data are entered in a table.

In the example tables in FIGS. 23A and 23B, weights 3 and 7 for the Ming style, weight 5 for the round Gothic style, weight 6 for the angular Gothic style, and weights 4 and 7 for the Block style are present.

At step (2), a check is performed to determine whether or not requested weight data have been stored in a storage device, such as a ROM or a hard disk. The table prepared at step (1) is searched, and by employing the requested font style and the weight data it can be determined whether or not data are stored in a storage device. When the requested weight data have been stored in a storage device, program control advances to step (3). When the data have not yet been stored, program control moves to step (4).

The process at step (3) is performed when the requested weight data have been stored in a storage device. Since the thickening/narrowing process is not required, coordinate data are read from the storage device. By referring to the data the enlargement/reduction process is performed in consonance with the output size, and a bit mapped font is prepared. The process is then terminated.

The process at step (4) is performed when the requested weight data is not stored in a storage device. The thickening/narrowing process is performed to output a character that has the requested weight.

It is therefore necessary to select source data for performing the thickening/narrowing process. In general, the result obtained through the thickening process deteriorates less than that obtained through the narrowing process. Therefore, by employing the table prepared at step (1), a check is performed to determine whether or not data for a weight that is smaller than the requested weight are stored in a storage device.

When data for a weight that is smaller than the requested one are stored in a storage device, program control moves to step (5). When the data for the smaller weight are not stored in a storage device, program control goes to step (6).

To output, for example, a Ming style font having a weight of 5, as the Ming style font with a weight of 3 is present in the storage device, program control moves to step (5). To output the angular Gothic style font having a weight of 3, as there is no angular Gothic style font having a smaller weight, program control moves to step (6).

At step (5), a font style that has a weight that will serve as the standard for the thickening process is selected. Parameters in the x direction and the y direction are set for the exterior and the interior outlines, for which the thickening process is performed.

To output the Ming style font having a weight of 5, as the Ming style font having a weight of 3 is present, the differences between weight 3 and weight 5 for the x direction and the y direction of each of the exterior and the interior outlines are set as thickening parameters. At step (6), a font style with a weight that serves as the standard for the narrowing process is selected. Then, parameters for the x direction and the y direction of each of the exterior and interior outlines are set.

To output the angular Gothic style font having a weight of 3, as the angular Gothic style font having a weight of 6 is present, the differences between weights 3 and 6 for the x direction and the y direction of the outlines are set as parameters.

After the thickening or narrowing parameters have been set at step (5) or (6) as described above, the process as explained in the first embodiment is performed and a character having a desired weight is output. Although an explanation has been given for the determination of whether or not font data with smaller weight than that of a target character are present, a check may be performed to determine whether or not larger weight font data than the weight of a target character are present.

In addition, data for the weight closest to the weight of the target character may be selected and employed to perform weight conversion.

Third Embodiment

Another embodiment will now be described.

An explanation will be given of the employment for a gray scale font of the thickening process performed in the first and second embodiments.

While the bit mapped font is a binary font where its dot value is either "0" or "1", the gray scale font is a multi-value font where each dot can have multiple values, such as 0 through 3, 0 through 5, or 0 through 255.

Figures 24, 26A, 26B, 26C:
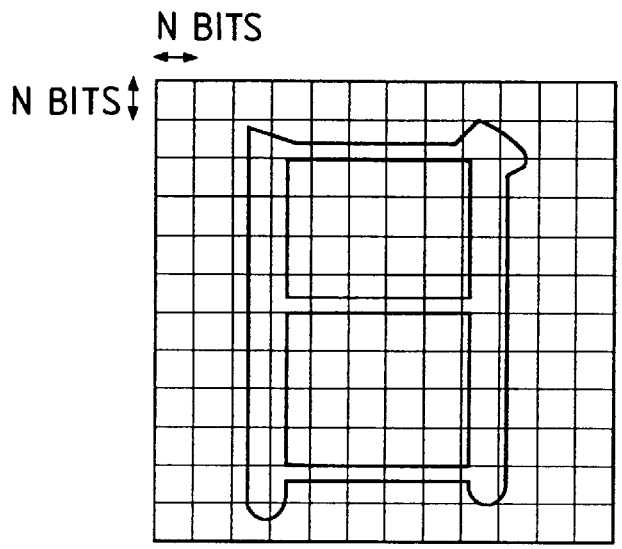
FIG. 24 is a diagram for explaining a bit map that is employed for preparing a gray scale font with a character generating apparatus according to the present invention.
FIGS. 26A, 26B, and 26C are diagrams, each of which show an example of a gray scale font conversion table for a character generating apparatus according to the present invention.
Figures 25, 25A:
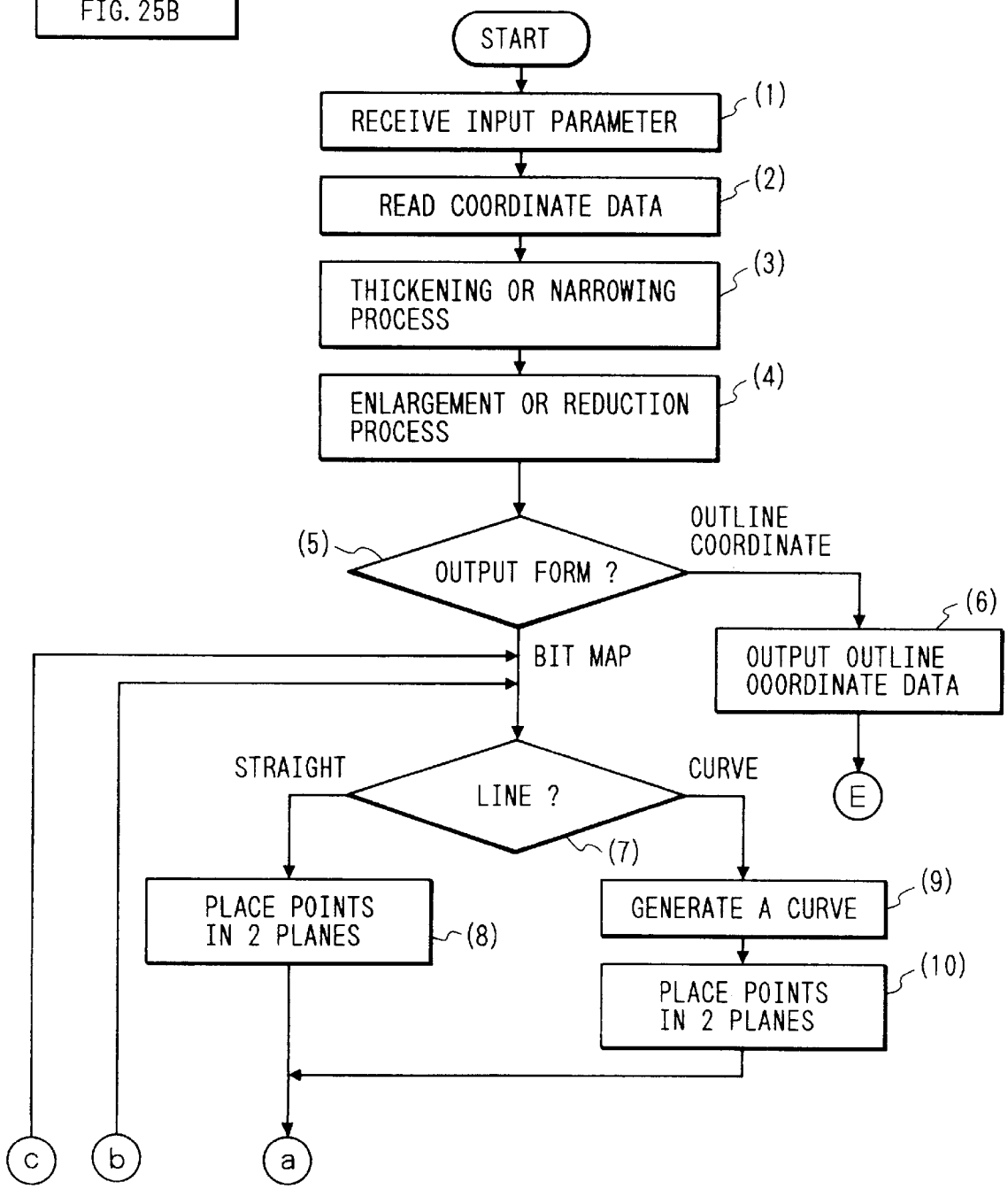
FIG. 25 is comprised of FIG. 25A and FIG. 25B showing flowcharts for a second character generating method for a character generating apparatus according to the present invention.

As a method for generating a gray scale font, generally, when a gray scale font with n2 gray levels is to be output, as is shown in FIG. 24, the requested output size is enlarged by n times in the vertical and the horizontal directions at step (4) in FIG. 25A, and a bit mapped font is prepared by employing the resultant output size.

A bit map is vertically and horizontally divided to form n bits, as is shown in FIG. 24. The number of bits 1 that are included in each n×n square field division determines the multiple values for one dot of a gray scale.

Figure 25B:
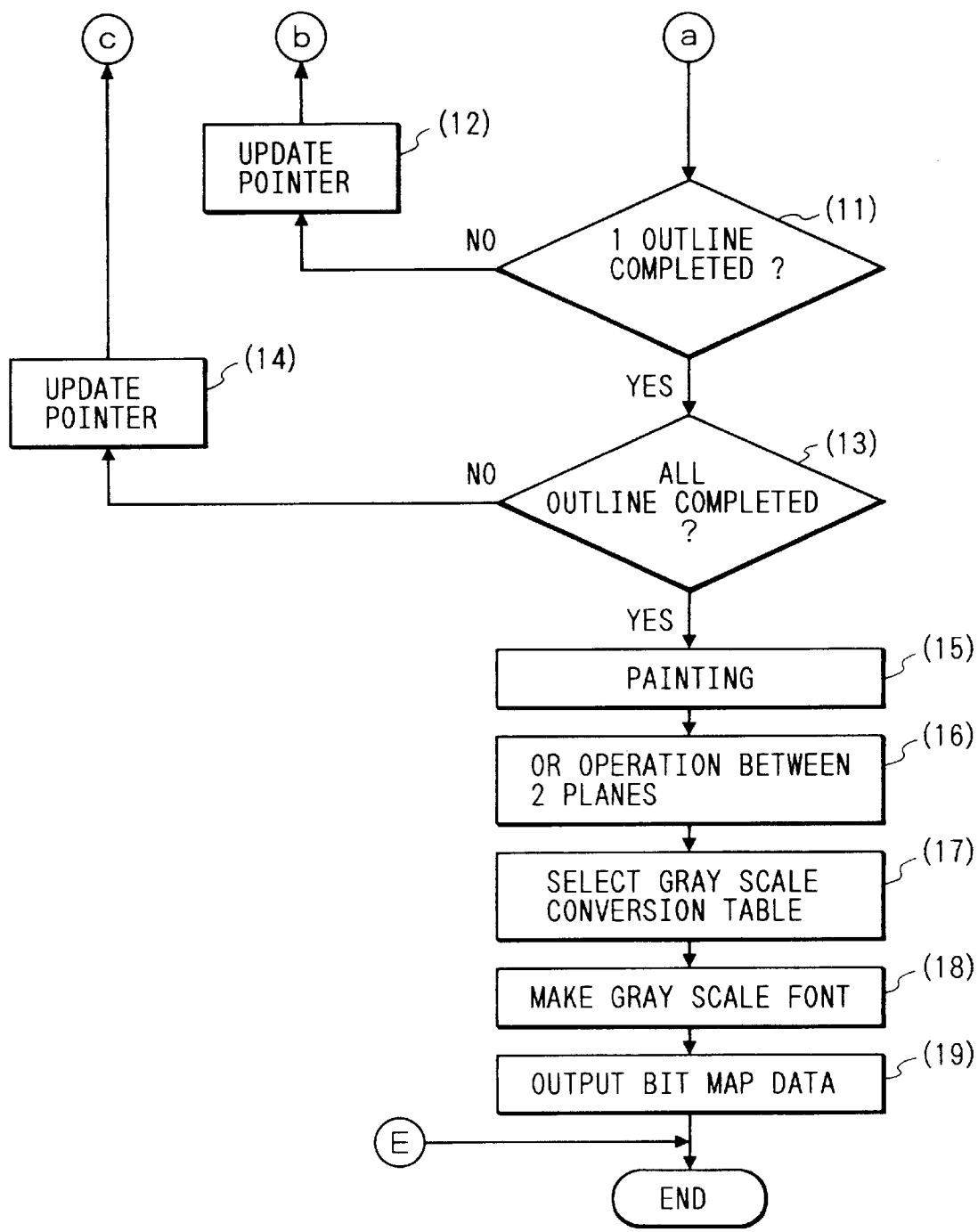

When the first embodiment is applied to the gray scale font, the processing is performed as is shown in the flowchart in FIGS. 25A and 25B.

FIGS. 25A and 25B are flowcharts for the second character generating method for a character generating apparatus according to the present invention. The numbers (1) through (19) indicate the steps of the procedure.

Since the flowchart for this processing is almost the same as that for the bit mapped font generation or for the outline coordinate output in the first embodiment, and as the steps almost correspond to those in FIGS. 3A and 3B, only procedure steps that differ due to the generation of the gray scale font will now be explained.

The steps that differ from those in FIGS. 3A and 3B are steps (1) and (4), and steps (17) and (18), which are added.

Input parameters are fetched at step (1), and gray scale data are added to the input parameters. The parameters are, for example, a character code, a font style, weight data, and a character output size, gray level data, an output form, and the characteristics of an output device.

The character codes are determined by a character code system, such as the JIS codes, the shift JIS codes, the EUC codes, or the UNI codes, by which a target system is specified in advance.

The font style is selected from data that is incorporated into the system in advance, such as Ming, Gothic, or Round Gothic, or data that are added as options.

The contents of the data are exactly the same as the data that are employed for generating the bit mapped font. Special data for generating the gray scale font are not stored.

The weight data are data for the line thicknesses of the font style, and the data "very thin", "thin", "standard", "thick", and "very thick" are provided. The output size is data that indicates the actual size of the font data that are to be output. The sizes in the x direction and the y direction are requested. The gray level data designate the gray level at which the gray scale font is to be prepared.

The gray levels are set to a 4, a 16, or a 256 level in accordance with the characteristics of an output device. The output form is the output data form for a desired font, and includes an outline coordinate data output, a bit mapped font output, a gray scale font output, and a 1-dot expression form.

The 1-dot expression form of, for example, the gray scale font is employed to indicate whether one dot is expressed by one byte, or whether two or four dots are expressed by one byte. The characteristics of the output device are data that indicate how to determine a gray level for the preparation of an optimal gray scale font for the display unit.

At step (4), by referring to the output size and the gray level of the gray scale font, the enlargement/reduction process is performed for the coordinate data read at step (2). When the requested output size is (Ax, Ay), a gray level is n, the coordinates acquired at step (3) are (x, y), the coordinates obtained after the enlargement/reduction process is performed are (X, Y), and the character frame size for the stored data is (Mx, My), the expression for data enlargement or reduction is $$(X, Y) = (x \times \sqrt{n} \times Ax/Mx, y \times \sqrt{n} \times Ay/My).$$

At steps (17) and (18), a gray scale font is prepared by employing the bit mapped font prepared at step (16). First, at step (17), the gray scale conversion table is selected according to the output device characteristic, that is acquired as an input parameter. With a mask of 4×4 for the 16 gray levels, values that represent the output device characteristic are stored in advance in the gray scale font conversion table, as is shown in FIG. 26.

FIG. 26A shows an example where the luminance characteristic of the output device is uniform; FIG. 26B shows an example where the luminance is high in the center of a dot and lower in its peripheral portion; and FIG. 26C shows an example where the luminance is high in the peripheral portion of a dot and lower in its center.

From among these, the table most appropriate for the luminance characteristic of the output device is selected. Then, at step (18) a gray scale font is prepared by employing the table selected at step (17). This processing will now be explained while referring to FIG. 27.

Figures 27, 28:
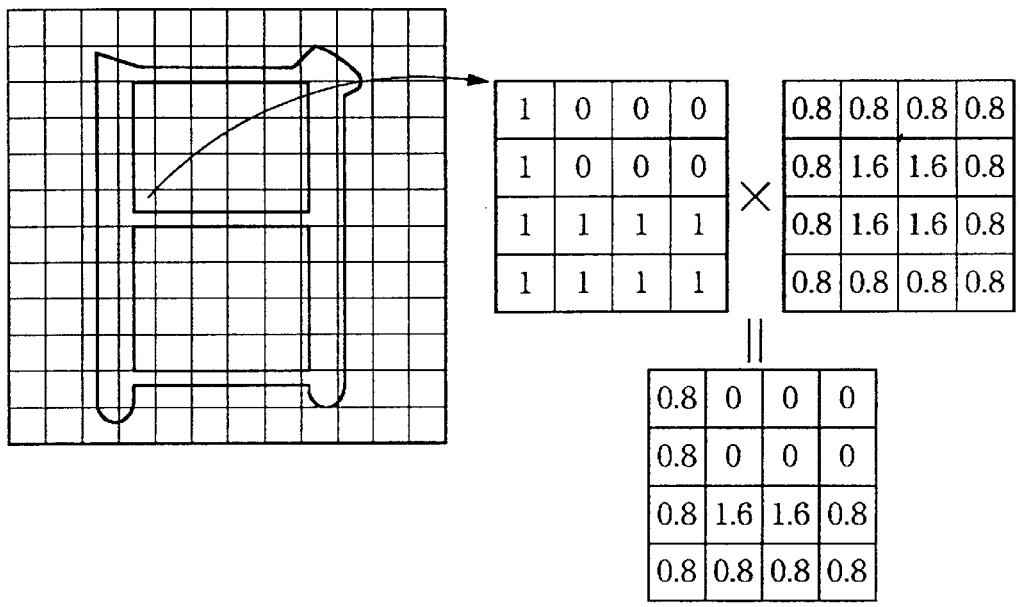
FIG. 27 is a diagram showing the gray scale font conversion process for a character generating apparatus according to the present invention.
FIG. 28 is a diagram showing a gray scale converted state for a character generating apparatus according to the present invention.

FIG. 27 shows a bit mapped font that is acquired at step (16). The vertical and horizontal lengths have been prepared by multiplying $\sqrt{n}$ by the gray level n.

Therefore, the vertical and horizontal lengths are divided by $\sqrt{n}$ and the $\sqrt{n} \times \sqrt{n}$ grid square is extracted. A bit value for each grid square is multiplied by a value entered in its corresponding gird square in the table, which is acquired at step (17).

The sum of the products provides a gray scale value for a target dot.

FIG. 27 shows an example where a gray scale font with 16 gray levels is output. The table in FIG. 26B is selected for the 4×4 grid square.

The above described process is performed for all the grid squares, so that the gray scale font as is shown in FIG. 28 is generated. Then, at step (19), the gray scale font is stored in consonance with the output form and data are returned to the request side.

If the requested output form is one byte for one dot, values at the grid squares are compressed into one byte and stored.

If the requested output form is for the compression of adjacent points into one byte, one dot is compressed into four bits and stored, and the data are then returned to the request side. The process is then terminated.

Fourth Embodiment

Since block circuits for a character generating apparatus of this embodiment have been explained while referring to FIGS. 1 and 2, their explanation will not be given here.

In the character generating apparatus arranged as is shown in FIGS. 1 and 2, the CPU 1 executes, according to a parameter that indicates a determined character weight, a conversion program that is stored in the ROM 2, and transforms the coordinate values of outline data into other data that will be described later. The CPU 1 then generates a thick or thin character pattern according to the outline data whose coordinates have been transformed, and either a thick character or a thin character that has a different weight is produced by employing a few character data.

Further, the CPU 1 determines a transformed coordinate value, by referring to coordinate values of two points that are adjacent to the coordinates of a target, and produces a well balanced thick or thin character pattern.

In addition, the CPU 1 determines independent character weights for an x direction and a y direction by employing the outline data, and generates a thick or a thin character pattern that effectively depicts the characteristic of each font style.

Moreover, according to the converted outline data the CPU 1 outputs either a bit mapped font, outline coordinate data, or a gray scale font, and supplies thick or thin character data in an appropriate data form to various output means. Further, in accordance with a parameter that indicates a determined character weight, character data that the CPU 1 will convert is determined from a table, which is stored in the ROM 2, and the coordinate values of the outline data, which correspond to the determined character data, are transformed. In accordance with the outline data whose coordinates are transformed, a thick or thin character pattern is generated, so that the character data source is utilized to produce the most preferred thick or thin character data.

Also, the CPU 1 generates more strict thick or thin character data by converting character data that have a character weight which is close to a determined character weight.

The detailed processing of the embodiment of the present invention will now be explained while referring to the flowchart in FIGS. 29A and 29B.

Figure 29:
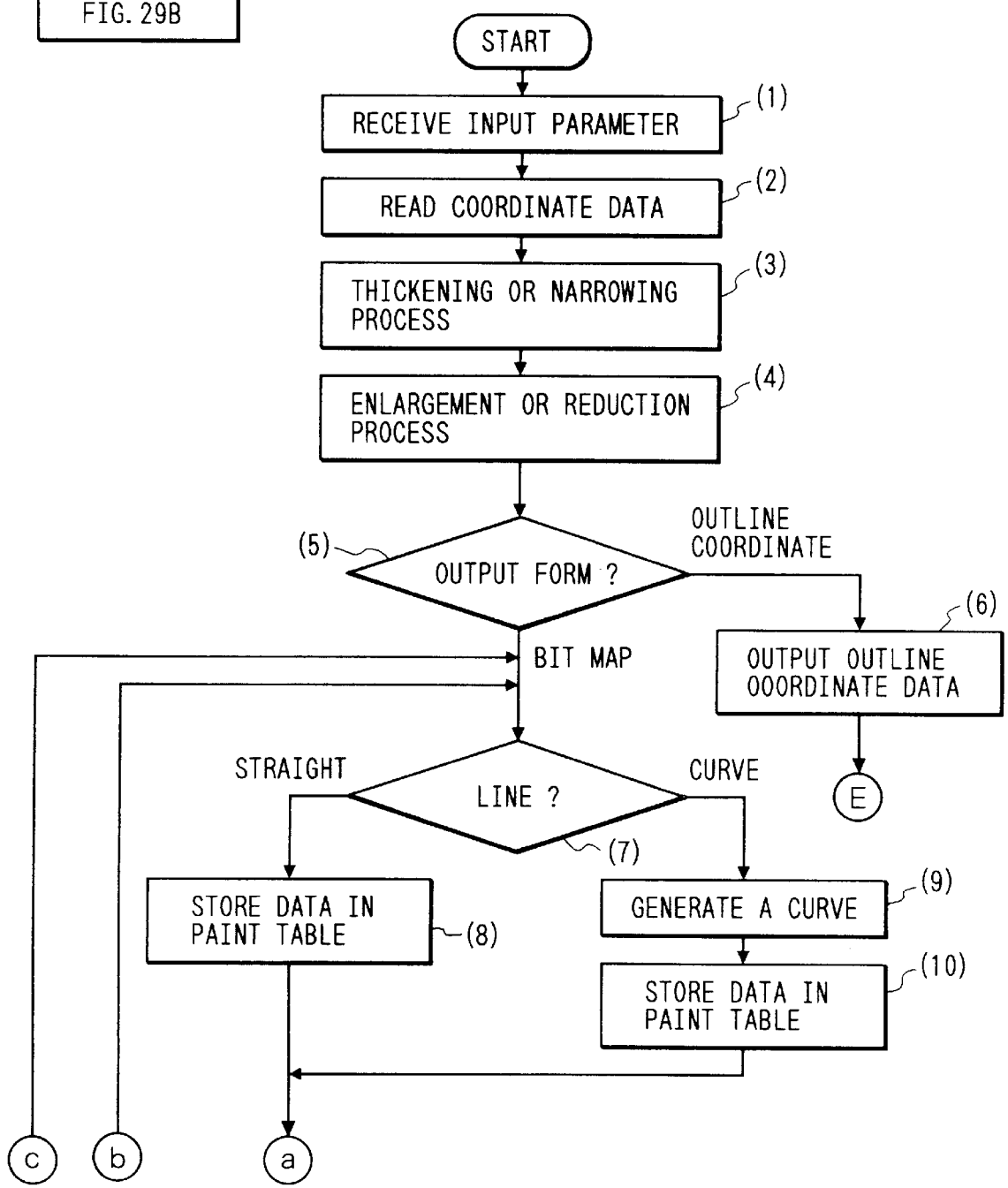
FIG. 29 is comprised of FIG. 29A and FIG. 29B showing flowcharts of a third character generating method for a character generating apparatus according to the present invention.
Figure 29B:
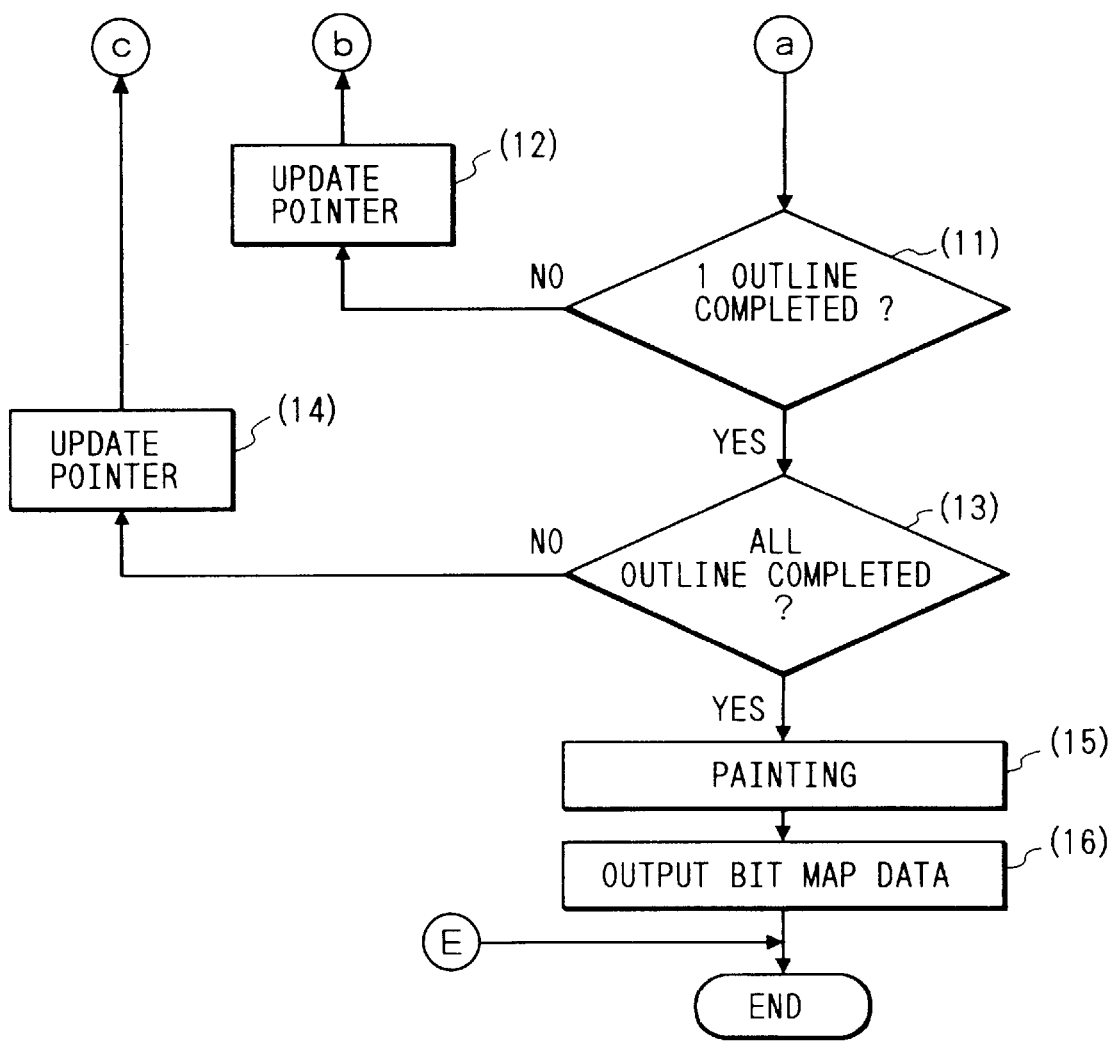
Figure 30:
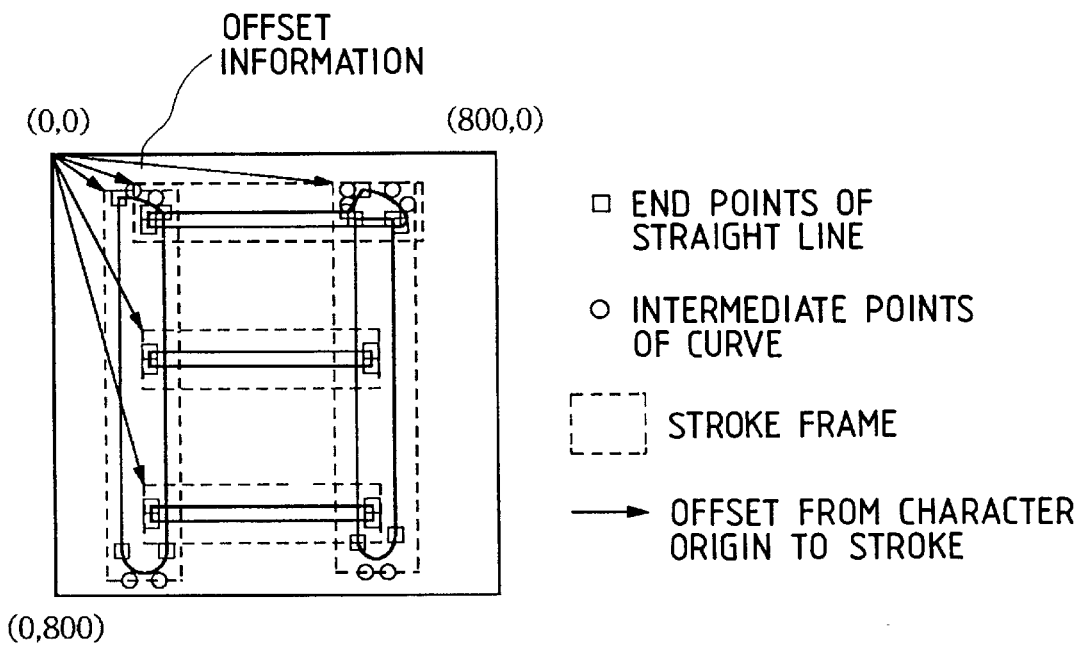
FIG. 30 is a specific diagram showing the configuration of an outline font before it is converted by a character generating apparatus according to the present invention.

The flowchart in FIGS. 29A and 29B show the third character generating method for a character generating apparatus according to the present invention. The numbers (1) through (16) indicate the steps of the procedure.

An explanation will be given that involves the use of the data for one font style, which is present in a system and which has a specific weight, to generate data for characters that have a different weight.

Input parameters are received at step (1). The input parameters may be, for example, a character code, a font style, weight data, and a character output size and form that is to be output. The character codes are determined by a character code system, such as the JIS codes, the shift JIS codes, the EUC codes, or the UNI codes, by which a target system is specified in advance. The font style is selected from data that the system incorporates in advance, such as Ming, Gothic, or Round Gothic, or data that are added as options. A weight is data for the line thickness of the font style, and the data "very thin", "thin", "standard", "thick", and "very thick" are provided. The output size is data that indicate the actual size of the font data that are to be output. The output form is the output data form for a desired font, and an output request, such as an outline coordinate data output or a bit mapped output, is issued.

The coordinate data for a target character are read at step (2). The data are stored in advance in the ROM, in the RAM, on a hard disk, or on a floppy disk. The font style data and character code data of the data fetched at step (1) are examined, and the required amount of coordinate data are read. The coordinate data that are to be read are data that are obtained by extracting the characteristic points of the outline of a character, as is shown in FIG. 4. The data include attribute information, such as a straight line data/curve data determination flag and an outline start point/end point flag, for each coordinate point. Although an interpolation expression for curve data employed in this embodiment can be the second or the third B spline curve, or the second or the third Besier curve, the interpolation expression to be employed is determined in advance.

Figure 31:
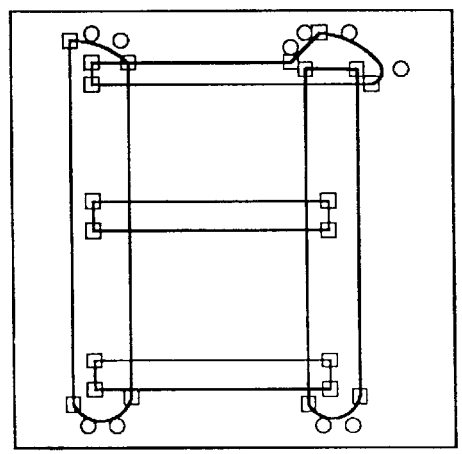
FIG. 31 is a specific diagram showing the configuration of an outline font after it is converted by a character generating apparatus according to the present invention.

The minimum value of the coordinates that are used to describe a character frame is "0", and the maximum value is "800". Offset information from the character origin point to standard points in each stroke frame is also included. At step (3), a thickening or a narrowing process is performed for the coordinate data in consonance with the weight data included in the input parameters. The details of this process will be described later while referring to the flowchart in FIG. 37. As the result of this process, the coordinate data are transformed into those for a thickened or a narrowed outline, as is shown in FIG. 31.

After the thickening or the narrowing process is performed, the coordinate points have a one to one correspondence, and the attribute flags for each point do not vary. At step (4) an enlargement or a reduction process is performed for the thickened or the narrowed coordinate data, which are obtained at step (3), in consonance with the output size that was included as an input parameter.

When a requested output size is (Ax, Ay), the coordinate values obtained at step (3) are (x, y), the coordinate values after the enlargement or reduction process is performed are (X, Y), and a stored character frame size is (Mx, My), then $$(X, Y) = (x \times Ax/Mx, y \times Ay/My).$$

All the coordinates for a single character are calculated using the above expression. The attribute flags for each of the coordinate points, which are obtained at step (3), do not vary. When a bit mapped output is requested at step (5), program control advances to step (7). Steps (7) through (13) are the procedures for actually preparing bit mapped data from coordinate data. At step (7) a check is performed to determine whether the target coordinate data are straight line data or curve data.

When, at step (7), the coordinate data are straight line data, the coordinate point is defined as the start point for a straight line, and the following coordinate point is defined as the end point for the straight line. Program control then moves to step (8). When, at step (7), the target data are curve data, the coordinate data for points between the coordinate point and the point where the curve end flag is placed are assumed to be curve data. Program control then moves to step (9). A process for generating a straight line is performed at step (8). In this case, a DDA method is employed to generate a straight line. The coordinate data that are acquired by the DDA are entered in a coordinate table for painting, as is shown in FIG. 33.

Figure 33:
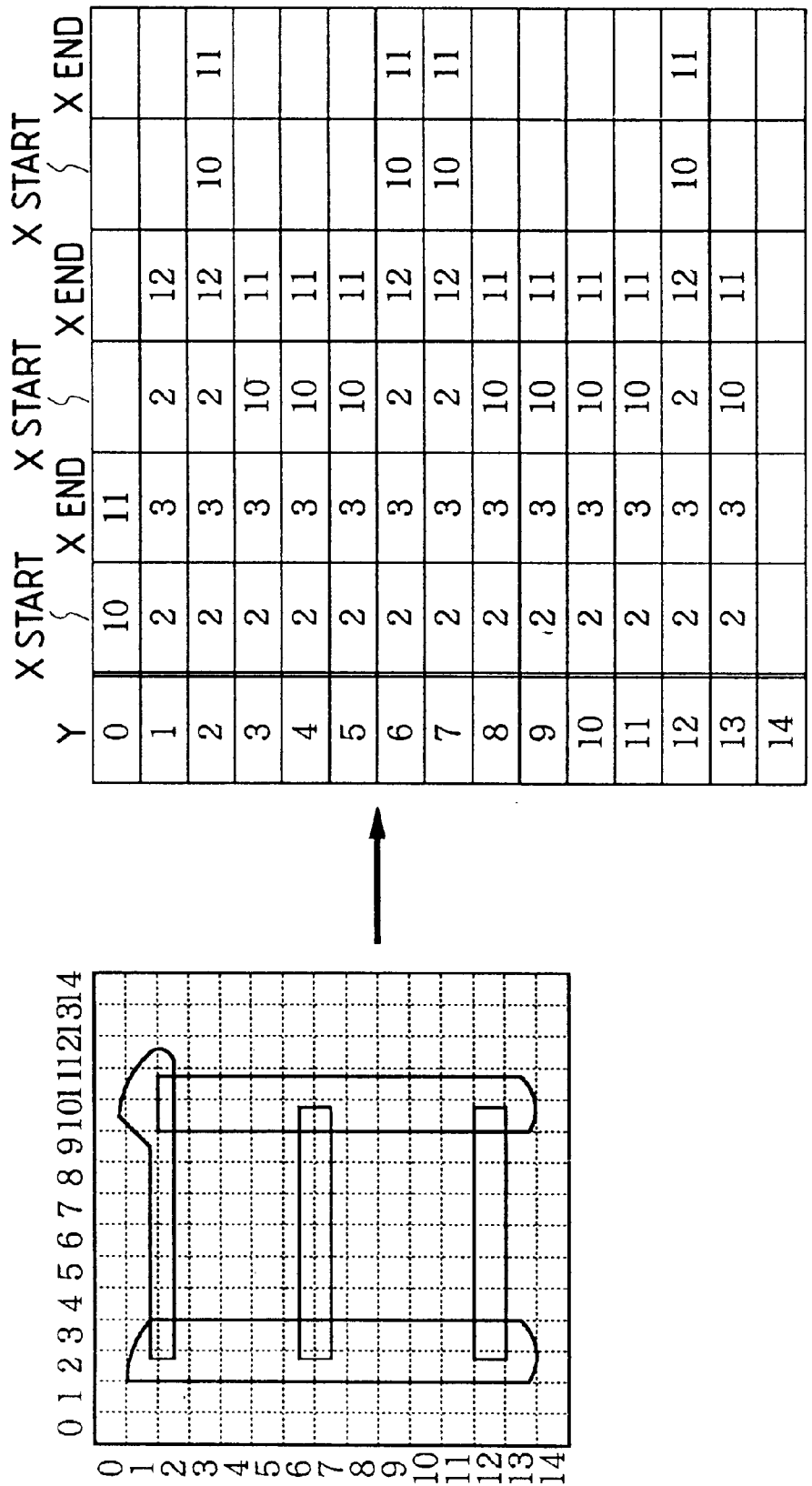
FIG. 33 is a specific diagram showing the preparation of a painting table by employing coordinate data in a character generating apparatus according to the present invention.

In the coordinate table for painting shown in FIG. 33, a start coordinate and an end coordinate for the x coordinate are entered for each y coordinate in the output area. When, as the result of the DDA method, a plurality of x coordinates are present for a single y coordinate, the x coordinate is set so that it is the outermost one relative to the outline of a stroke. At step (9), curve data are converted into the assemblage of short straight lines (short vectors).

FIG. 9 illustrates the conversion of a third Besier curve into an assemblage of short vectors. Since this process has been previously described, an explanation of this process will not be given here.

At step (10), coordinate data are entered in the coordinate table for painting in accordance to the short vector assemblage that is acquired at step (9). The method of entering the coordinate data in the table is the same as that which was performed at step (8). This process is repetitively performed for all the short vectors.

A check is performed at step (11) to determine whether the processing for all the coordinate data for one outline has been completed. If the processing has been completed, program control advances to step (13). If the process has not yet been completed, program control moves to step (12). At step (12) a pointer for current coordinate data is updated to process the next data. If the next data are straight line data, a pointer is updated to point to the next coordinate data. If the next data are curve data, a pointer is updated to point to a curve end coordinate point.

Figure 34:
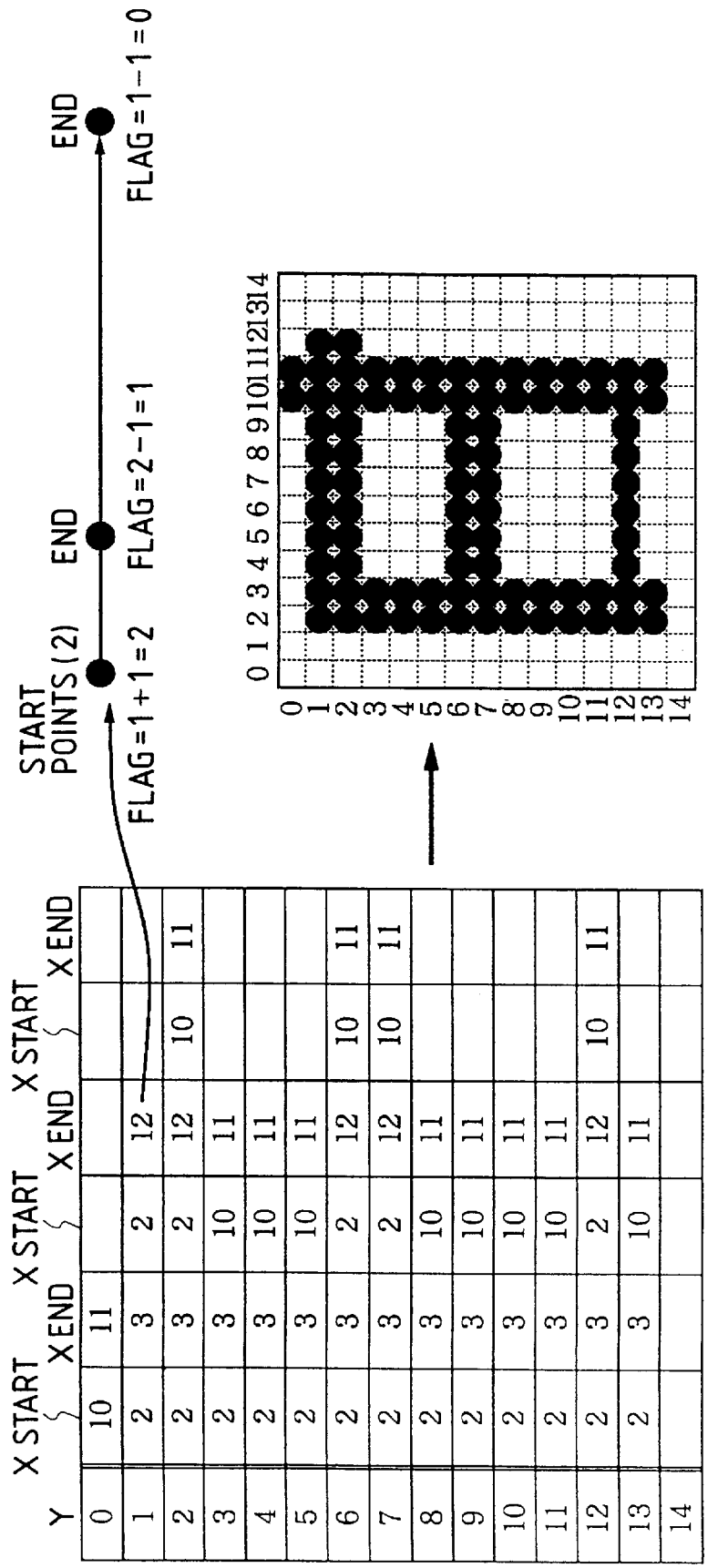
FIG. 34 is a diagram showing a bit map font generating process for a character generating apparatus according to the present invention.

Program control then returns to step (7), where a check is performed to determine whether or not the data are for a straight line or for a curve, and points are placed according to the data. A check is performed at step (13) to determine whether or not all the outline data for one character have been processed. When all the outline data have been processed, program control advances to step (15). When the processing has not been completed, program control moves to step (14). Since the data for one outline have been processed, a pointer is shifted to point to the head of the next outline at step (14), and program control returns to step (7). Since at step (15) the points for all the coordinate data have been placed on two planes, painting is performed, by a non-zero winding method, for the x coordinates that correspond to the y coordinates and that are stored in the painting coordinate table at steps (8) and (10), as is shown in FIG. 34. According to this method, the plane is scanned from the left along each scanned line. The value of a flag at start point is incremented, while the value of a flag is decremented. If the flag values are not a "0". The interval between the points of those flags are painted with "1".

Finally, at step (16), data for one character, which is acquired at step (15), are returned to an area that is designated by a request side, and the process is thus terminated.

The thickening/narrowing example process at step (3) in FIG. 29 will now be described in detail, while referring to the flowchart in FIG. 35.

In the thickening/narrowing process in this embodiment, a parameters for thickening/narrowing a stroke is varied to change the coordinates for each outline point.

Figure 35:
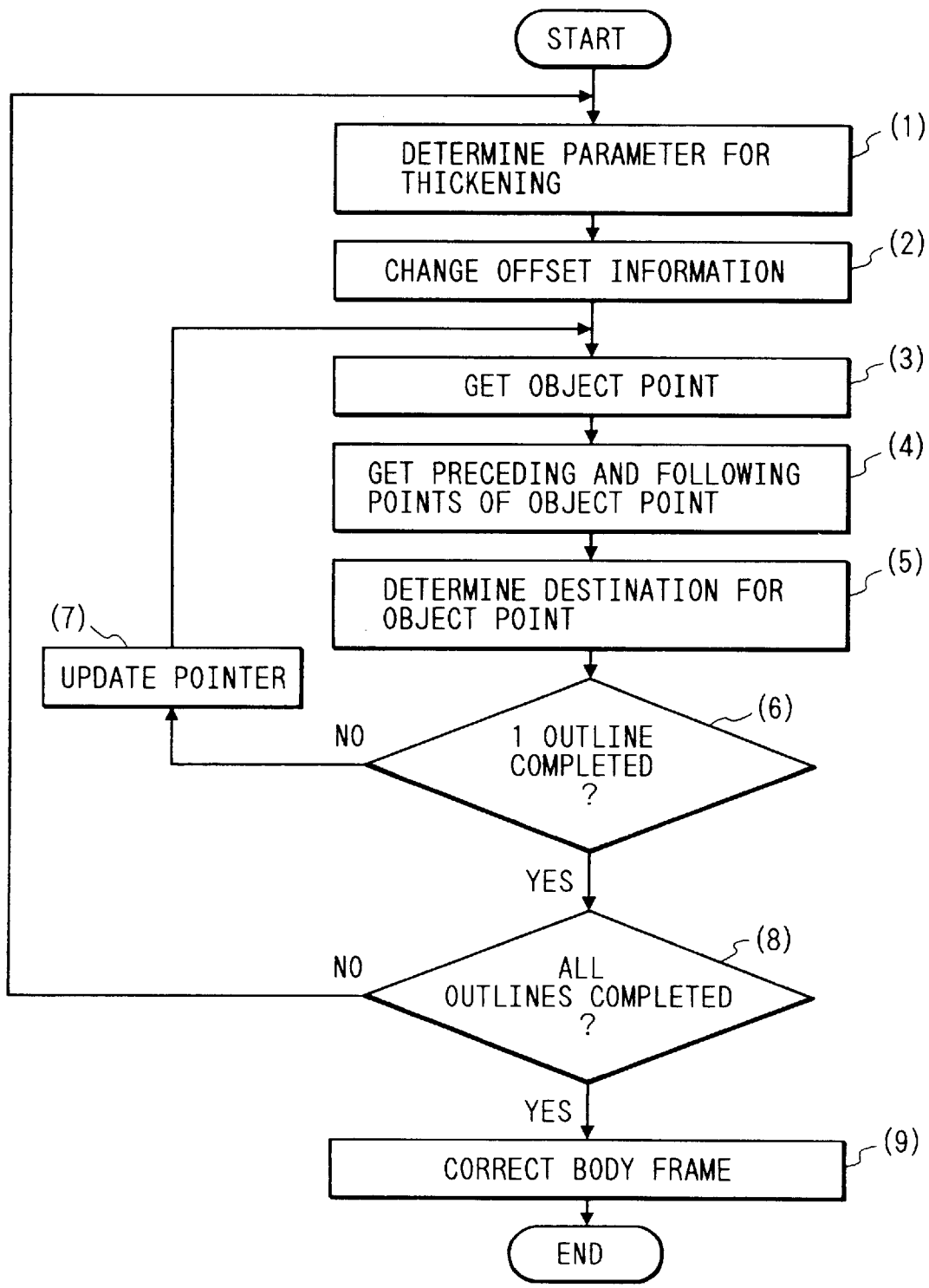
FIG. 35 is a flowchart showing a thickening/narrowing procedure example for a character generating apparatus according to the present invention.

FIG. 35 is a flowchart showing an example thickening/narrowing procedure for a character generating apparatus according to the present invention. The numbers (1) through (9) indicate the steps of the procedure.

At step (1) a parameter for the thickness of an outline is determined in consonance with a weight value. A parameter for determining the outline thickness has independent values in the x direction and the y direction for the outline, and manages the thickening of horizontal lines and of vertical lines separately.

Figure 36:
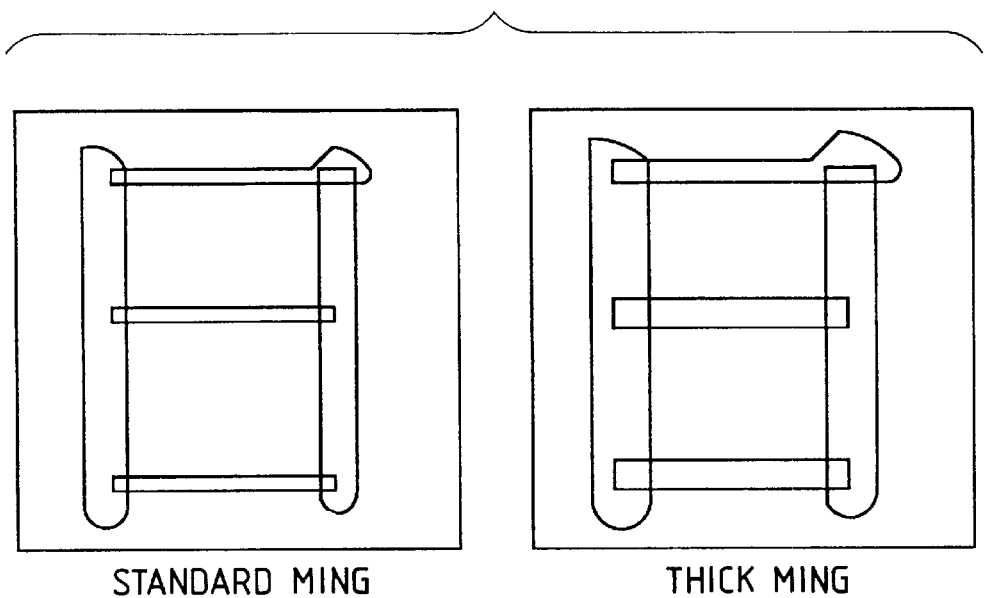
FIG. 36 is a diagram showing preprocessing for determining an exterior outline or an interior outline for a character generating apparatus according to the present invention.
Figure 37:
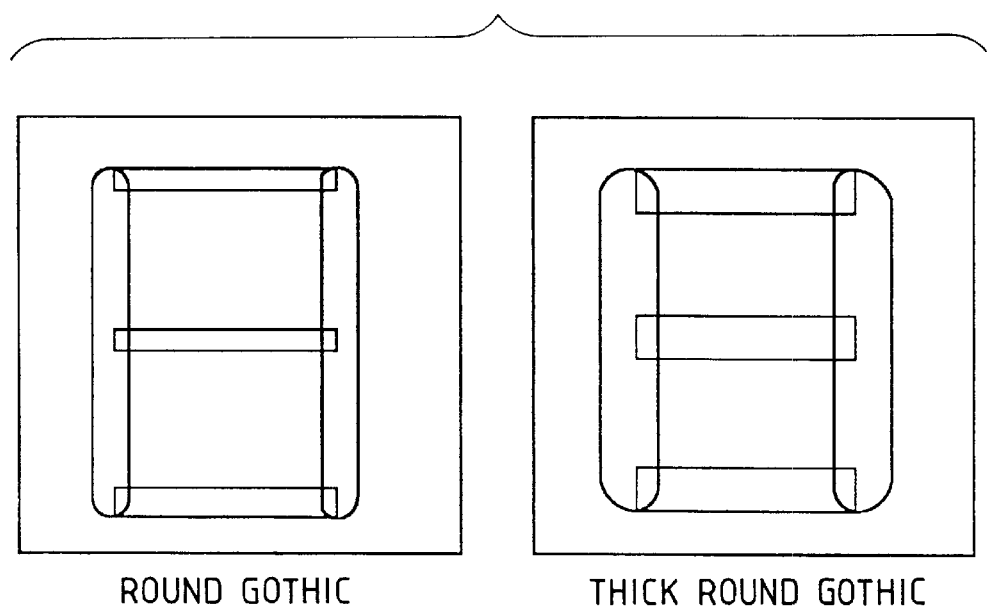
FIG. 37 is a diagram showing the results obtained by the Gothic thickening process of a character generating apparatus according to the present invention.

This is because to thicken a Ming character, for example, as is shown in FIG. 36, its horizontal lines need not be thickened much while its vertical lines must be thickened a great deal, and therefore different values are required for the x direction and the y direction. For round Gothic font style characters, however, the lines in the horizontal direction are thickened as much as those in the vertical direction, as is shown in FIG. 37. Therefore, the thickening values for the individual font styles have to be changed. As is shown in FIG. 38, data that indicate reference values from the outlines to the centers of the horizontal and the vertical lines of font styles and weights are entered in advance in a table. The difference between a standard font weight and a desired font weight is employed to determine the thickening of the outlines in the x direction and the y direction. When the thickening value is positive, the thickening process is performed, while when the thickening value is negative, the narrowing process is performed. For the round Gothic style that employs coordinate data for thickening as standard data, to generate a very thin, round Gothic character, a thickening value (parameter) is determined by ascertaining the difference between 10 and 25 for the x direction and the difference between 10 and 25 for the y direction.

At step (2), offset information for each stroke is varied in consonance with a thickening parameter. To obtain the changed offset information, an x value and a y value of the thickening parameter are subtracted from the x coordinate and the y coordinate of the offset. At steps (3) through (7), the thickening/narrowing process is performed for all the coordinate point rows that consist of one stroke. First, at step (3), an object point to be processed is fetched. Then, at step (4), points that are adjacent to the object point are fetched.

At step (5), the thickening process is actually performed. Since this process has been explained in detail while referring to FIG. 17, its explanation will not be given here. The range within which the point is shifted is equivalent to the hypotenuse of a triangle that is formed with the x thickening value and the y thickening value that are obtained at step (1). As the coordinate values that are acquired in this process are those for a single stroke frame, they are added to the offset coordinate values that are obtained at step (2) to provide coordinates from the character origin.

When, at step (6), all the coordinate points for one outline have been processed, program control advances to step (8). When there are some outline points to be processed, program control moves to step (7), where a pointer is updated to point to the next outline point, and the thickening process is performed again. A check is performed at step (8) to determine whether or not all the outlines for one character have been processed. When the processing has been completed, program control moves to step (9). When there are outlines that remain to be processed, a pointer is updated to point to the next outline point, and the thickening process is performed again.

When the thickening process has been performed for all the outline coordinate points, program control goes to step (9). As is shown in FIG. 15, while the thickening process has been performed, the resultant character frame is larger, while when the narrowing process has been performed, the resultant frame is smaller.

Thus, it is necessary for the size of the resultant frame to be adjusted to conform to the size of the original character frame. The rate of enlargement/reduction is twice the thickening value for the outline (a negative thickening value for the narrowing), which was acquired at step (1).

When the X width of the original character frame is Bx, the horizontal thickening value of the exterior outline is Fx, the Y width is By, the vertical thickening value of the exterior outline is Fy, the coordinates for which the thickening process is performed are (x, y), and the coordinates after the character frame size has been adjusted are (X, Y), $$(X, Y)=((x+Fx) \times Bx/(Bx+Fx \times 2), (y+Fy) \times By/(By+Fy \times 2)).$$

This calculation is performed for all the coordinate point rows for one character, and the thickening process shown in FIG. 35 is thus terminated.

Fifth Embodiment

The fifth embodiment will now be described. An explanation will be given for a case where, when a font style with a specific weight is requested, there are two or more weights that can be employed as standards for the same font style.

In this case the selection, from among a plurality of font weights for the same font style, of the font weight that is to be used to process a requested weight is important. Therefore, when the font style that has a standard weight is determined, the following weight conversion process is performed in the same manner as it is performed for the first embodiment. An explanation will thus be given only for a method of selecting a weight as a standard.

FIG. 22 is a flowchart showing an example procedure for selecting a thickening parameter for a character generating apparatus according to the present invention. The numbers (1) through (6) represent the steps of the procedure.

First, it is necessary at step (1) to examine which weights of which font styles are stored in a storage device. Header data that are stored in the headers for the font styles are referred to, and data that indicate the presence of such data are entered in a table. In the example tables in FIGS. 39A and 39B, weights 3 and 7 for the Ming style, weight 5 for the round Gothic style, weight 6 for the angular Gothic style, and weights 4 and 7 for the Block style are present.

At step (2), a check is performed to determine whether or not requested weight data have been stored in a storage device, such as a ROM or a hard disk. The table prepared at step (1) is searched, and by employing the requested font style and the weight data it can be determined whether or not data are stored in a storage device. When the requested weight data have been stored in a storage device, program control advances to step (3). When the data have not yet been stored, program control moves to step (4). The process at step (3) is performed when the requested weight data have been stored in a storage device. Since the thickening/narrowing process is not required, coordinate data are read from the storage device. By referring to the coordinate data the enlargement/reduction process is performed in consonance with the output size, and a bit mapped font is prepared. The process is then terminated.

The process at step (4) is performed when the requested weight data is not stored in a storage device. The thickening/narrowing process is performed to output a character that has the requested weight. It is therefore necessary to select source data for performing the thickening/narrowing process. In general, the result obtained through the thickening process deteriorates less than that obtained through the narrowing process. Therefore, by employing the table prepared at step (1), a check is performed to determine whether or not data for a weight that is smaller than the requested weight are stored in a storage device.

When data for a weight that is smaller than the requested one are stored in a storage device, program control moves to step (5). When the data for the smaller weight are not stored in a storage device, program control goes to step (6).

To output, for example, a Ming style font having a weight of 5, as the Ming style font with a weight of 3 is present in the storage device, program control moves to step (5). To output the angular Gothic style font having a weight of 3, as there is no angular Gothic style font having a smaller weight, program control moves to step (6).

At step (5), a font style that has a weight that will serve as the standard for the thickening process is selected. Parameters in the x direction and the y direction are set to perform the thickening process. To output the Ming style font having a weight of 5, as the Ming style font having a weight of 3 is present, the differences between weight 3 and weight 5 for the x direction and the y direction of the outline are set as thickening parameters. At step (6), a font style with a weight that serves as the standard for the narrowing process is selected. Then, parameters for the x direction and the y direction of the outline are set.

To output the angular Gothic style font having a weight of 3, as the angular Gothic style font having a weight of 6 is present, the differences between weights 3 and 6 for the x direction and the y direction of the outline are set as parameters. After the thickening or narrowing parameters have been set at step (5) or (6) as described above, the process as explained in the fourth embodiment is performed and a character having a desired weight is output.

Although an explanation has been given for the determination of whether or not font data with smaller weight than that of a target character are present, a check may be performed to determine whether or not font data for a larger weight than the weight of a target character are present. In addition, data for the weight closest to the weight of the target character may be selected and employed to perform weight conversion.

Sixth Embodiment

The sixth embodiment will now be described. An explanation will be given of the employment for a gray scale font of the thickening process performed in the fourth and fifth embodiments.

While the bit mapped font is a binary font where its dot value is either "0" or "1", the gray scale font is a multi-value font where each dot can have multiple values, such as 0 through 3, 0 through 5, or 0 through 255. As a method for generating a gray scale font, generally, when a gray scale font with n2 gray levels is to be output, as is shown in FIG. 40, the requested output size is enlarged by n times in the vertical and the horizontal directions at step (4) in FIG. 41, and a bit mapped font is prepared by employing the resultant output size.

Figures 40, 42A, 42B, 42C:
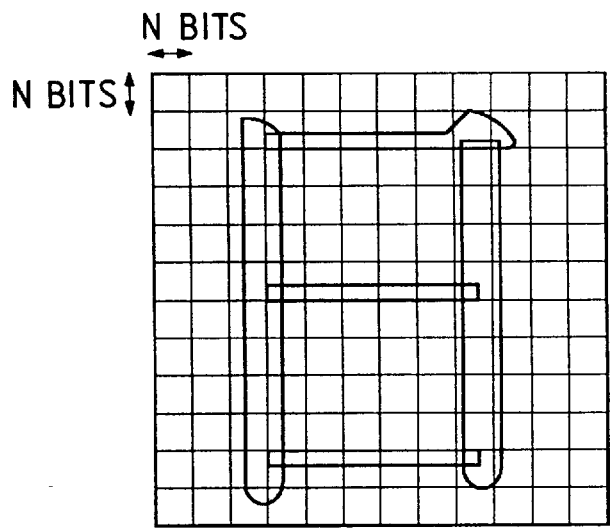
FIG. 40 is a diagram for explaining a bit map that is employed to prepare a gray scale font with a character generating apparatus according to the present invention.
FIGS. 42A, 42B, and 42C are diagrams, each of which shows an example of a gray scale font conversion table for a character generating apparatus according to the present invention.

A bit map is vertically and horizontally divided to form n bits, as is shown in FIG. 40. The number of bits 1 that are included in each n×n square field division determines the multiple values for one dot of a gray scale. When the fourth embodiment is applied to the gray scale font, the processing is performed as is shown in the flowchart in FIG. 41.

Figure 41B:
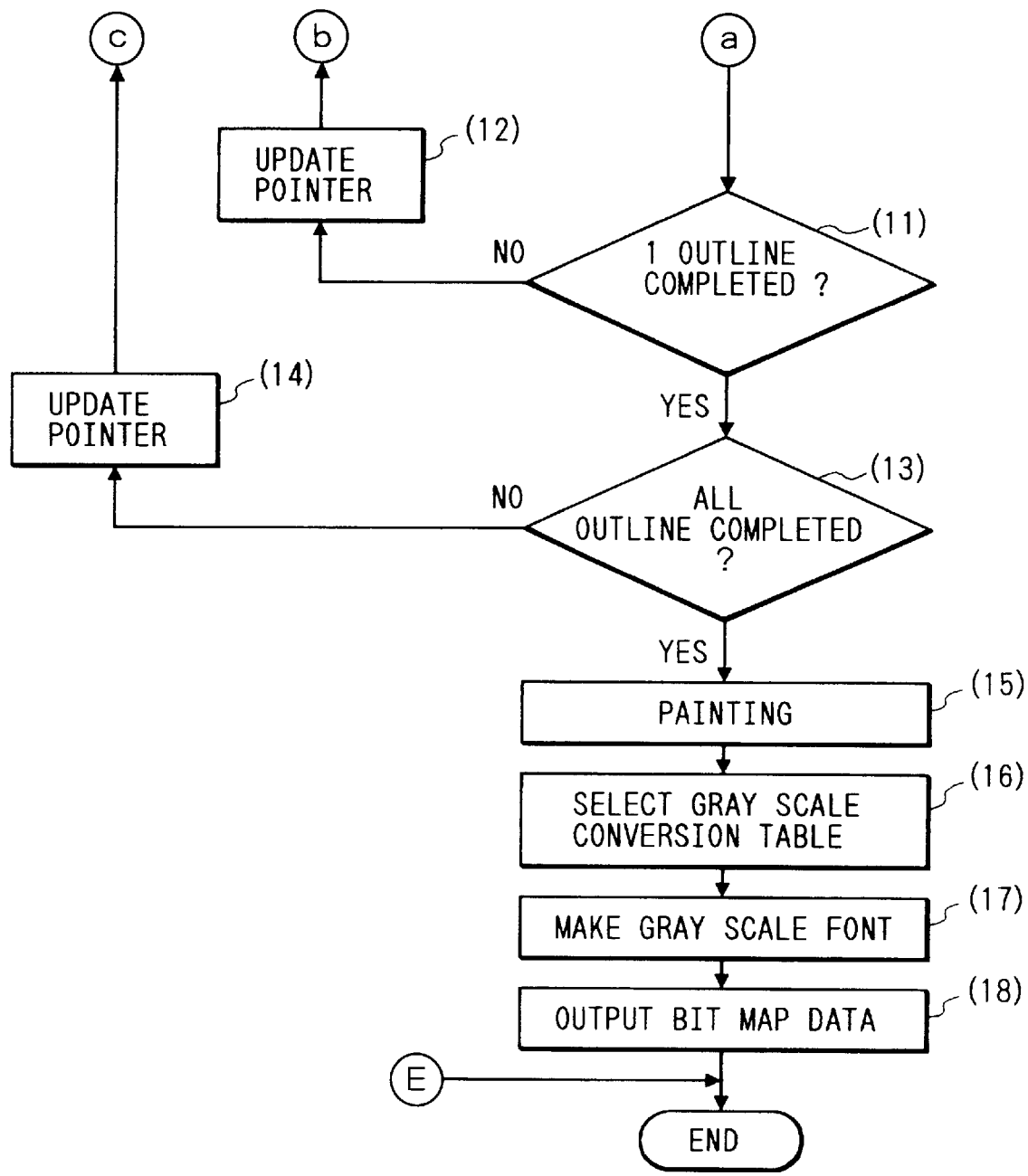
FIG. 41 is comprised of FIG. 41A and FIG. 41B showing flowcharts showing a second character generating method for a character generating apparatus according to the present invention.

FIGS. 41A and 41B are flowcharts for the fourth character generating method for a character generating apparatus according to the present invention. The numbers (1) through (18) indicate the steps of the procedure.

Since the flowchart for this processing is almost the same as that for the bit mapped font generation or for the outline coordinate output in the fourth embodiment, and as the steps almost correspond to those in FIGS. 29A and 29B, only procedure steps that differ due to the generation of the gray scale font will now be explained.

The different steps are steps (1) and (4), and steps (16) and (17), which are added.

Input parameters are fetched at step (1), and gray scale data are added to the input parameters. The parameters are, for example, a character code, a font style, weight data, and a character output size, gray level data, an output form, and the characteristics of an output device. The character codes are determined by a character code system, such as the JIS codes, the shift JIS codes, the EUC codes, or the UNI codes, by which a target system is specified in advance. The font style is selected from data that is incorporated into the system in advance, such as Ming, Gothic, or Round Gothic, or data that are added as options.

The contents of the data are exactly the same as the data that are employed for generating the bit mapped font. Special data for generating the gray scale font are not stored. The weight data are data for the line thicknesses of the font style, and the data "very thin," "thin," "standard," "thick," and "very thick" are provided.

The output size is data that indicates the actual size of the font data that are to be output. The sizes in the x direction and the y direction are requested. The gray level data designate the gray level at which the gray scale font is to be prepared. The gray levels are set to a 4, a 16, or a 256 level in accordance with the characteristics of an output device.

The output form is the output data form for a desired font, and includes an outline coordinate data output, a bit mapped font output, a gray scale font output, and a 1-dot expression form.

The 1-dot expression form of, for example, the gray scale font is employed to indicate whether one dot is expressed by one byte, or whether two or four dots are expressed by one byte.

The characteristics of the output device are data that indicate how to determine a gray level for the preparation of an optimal gray scale font for the display unit.

At step (4), by referring to the output size and the gray level of the gray scale font, the enlargement/reduction process is performed for the coordinate data read at step (2). When the requested output size is (Ax, Ay), a gray level is n, the coordinates acquired at step (3) are (x, y), the coordinates obtained after the enlargement/reduction process is performed are (X, Y), and the character frame size for the stored data is (Mx, My), the expression for data enlargement or reduction is $(X, Y) = (x \times \sqrt{n} \times Ax/Mx, y \times \sqrt{n} \times Ay/My)$.

At steps (16) and (17), a gray scale font is prepared by employing the bit mapped font prepared at step (15).

First, at step (16), the gray scale conversion table is selected according to the output device characteristic, that is acquired as an input parameter. With a mask of 4×4 for the 16 gray levels, values that represent the output device characteristic are stored in advance in the gray scale font conversion table, as is shown in FIGS. 42A to 42C.

FIG. 42A shows an example where the luminance characteristic of the output device is uniform; FIG. 42B shows an example where the luminance is high in the center of a dot and lower in its peripheral portion; and FIG. 42C shows an example where the luminance is high in the peripheral portion of a dot and lower in its center. From among these, the table that is most appropriate for the luminance characteristic of the output device is selected.

Then, at step (17) a gray scale font is prepared by employing the table that is selected at step (16). This processing will now be explained while referring to FIG. 43.

Figures 43, 44:
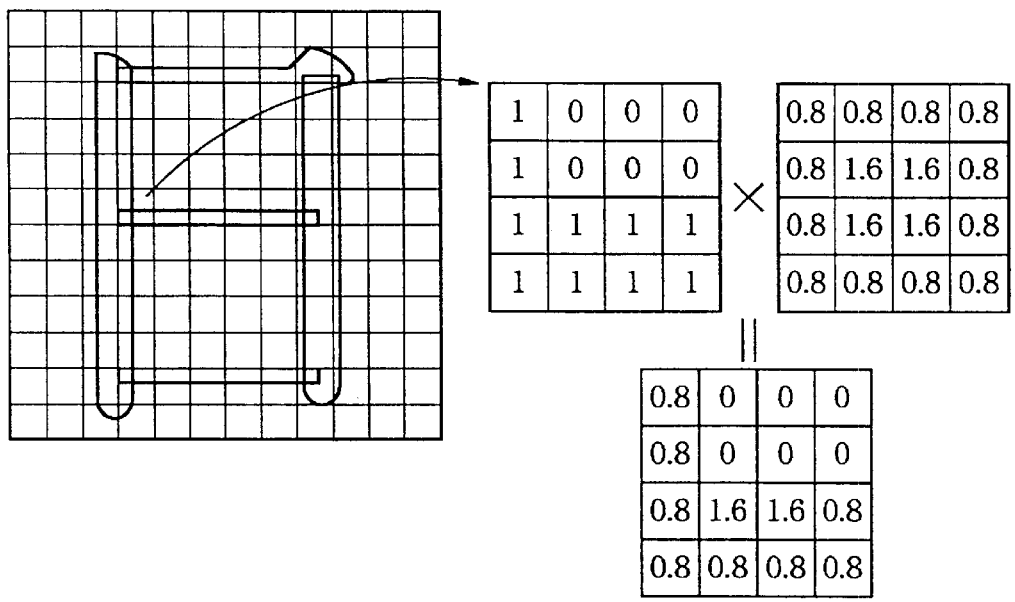
FIG. 43 is a diagram showing the gray scale font conversion process for a character generating apparatus according to the present invention.
FIG. 44 is a diagram showing a gray scale converted state for a character generating apparatus according to the present invention.

FIG. 43 shows a bit mapped font that is acquired at step (15). The vertical and horizontal lengths have been prepared by multiplying $\sqrt{n}$ by the gray level n. Therefore, the vertical and horizontal lengths are divided by $\sqrt{n}$ and the $\sqrt{n} \times \sqrt{n}$ grid square is extracted. A bit value for each grid square is multiplied by a value entered in its corresponding gird square in the table, which is acquired at step (16).

The sum of the products provides a gray scale value for a target dot. FIG. 42 shows an example where a gray scale font with 16 gray levels is output. The table in FIG. 42B is selected for the 4×4 grid square. The above described process is performed for all the grid squares, so that the gray scale font as is shown in FIG. 44 is generated.

Then, at step (18), the gray scale font is stored in consonance with the output form and data are returned to the request side. If the requested output form is one byte for one dot, values at the grid squares are compressed into one byte and stored. If the requested output form is for the compression of adjacent points into one byte, one dot is compressed into four bits and stored, and the data are then returned to the request side. The process is then terminated.

As described above, according to one embodiment of the present invention, a conversion means transforms coordinate values of outline data according to a determined character weight, and then a generation means generates a thick or thin character pattern according to the outline data whose coordinates have been transformed, so that either a thick character or a thin character that has a different weight can be produced by employing a few character data.

Further, according to another embodiment of the present invention, a transformed coordinate value can be determined by referring to coordinate values of two points that are adjacent to the coordinates of a target, so that a well balanced thick or thin character pattern can be produced.

In addition, according to a further embodiment of the present invention, exterior outline data and interior outline data can be extracted from outline data, and a thick or thin character pattern that has a pleasing appearance can be produced.

Moreover, according to an additional embodiment of the present invention, an input thick character weight or an input thin character weight can be determined independently, by employing extracted exterior outline data and interior outline data, and a thick or thin character pattern that has a pleasing appearance can be produced.

Further, according to still another embodiment of the present invention, independent character weights for an x direction and a y direction can be determined by employing extracted exterior and interior outline data, and a thick or a thin character pattern that effectively depicts the characteristic of each font style can be produced.

In addition, according to a still further embodiment of the present invention, either a bit mapped font, outline coordinate data, or a gray scale font can be output according to the converted outline data, and thick or thin character data can be supplied in an appropriate data form to various output means.

Moreover, according to yet another embodiment of the present invention, a parameter is determined by employing the weight of a character that is to be generated and a difference between the weights of character data that are stored, a conversion means employs the determined parameter to convert the coordinate value of outline data, and a generation means employs the resultant outline data to generate a thick or thin character pattern, so that the character data source is utilized to produce the most preferred thick or thin character data.

Also, according to one more embodiment of the present invention, more strict thick or thin character data can be generated by determining a parameter according to character data that have a character weight which is close to a determined character weight.

According to the present invention, therefore, only a small memory capacity is required for the generation of character data for font styles with various weights.

What is claimed is:

1. A character processing apparatus comprising:

input means for inputting weight information;

read means for reading coordinate data for a character to be output;

process means for thickening or narrowing the coordinate data read by said read means based on the weight information input by said input means, wherein a frame size of a character to be output is expanded or reduced based on a thickening or narrowing process, respectively;

correction means for correcting the frame size of the character to be output so that it remains the same after the thickening or narrowing process as before the thickening or narrowing process;

size change means for enlarging or reducing the coordinate data corrected by said correction means to a size of the character to be output; and generation means for generating dot pattern data based on the coordinate data enlarged or reduced by said size change means.

2. An apparatus according to claim 1, wherein said correction means corrects the thickened or narrowed coordinate data in accordance with the following equations:

$$X=[(x+Fx) \times Bx]/(Bx+Fx \times 2),$$

and $$Y=[(y+Fy) \times By]/(By+Fy \times 2),$$

where X and Y are horizontal and vertical coordinates after correction, x and y are horizontal and vertical coordinates for which a thickening or narrowing process is performed, Fx and Fy are horizontal and vertical thickening values, and Bx and By are horizontal and vertical widths of an original character frame, respectively.

3. An apparatus according to claim 1, further comprising determination means for determining whether the coordinate data read by said read means form an interior outline or an exterior outline, wherein said process means thickens or narrows the coordinate data forming the interior outline and the coordinate data forming the exterior outline distinguishably from each other in response to a determination made by said determination means.

4. An apparatus according to claim 1, wherein said process means thickens or narrows the coordinate data in the vertical direction and the coordinate data in the horizontal direction independently of each other.

5. An apparatus according to claim 1, further comprising output means for outputting the dot pattern data generated by said generation means.

6. An apparatus according to claim 5, wherein said output means comprises a printer.

7. An apparatus according to claim 5, wherein said output means comprises a display.

8. An apparatus according to claim 1, wherein the coordinate data comprises an entire-outline-type outline font data.

9. An apparatus according to claim 1, wherein the coordinate data comprises a stroke-type outline font data.

10. An apparatus according to claim 1, wherein said correction means further corrects the coordinate data thickened or narrowed by said process means so that the frame size remains the same after the thickening or narrowing process as before the thickening or narrowing process.

11. An apparatus according to claim 10, wherein said correction means corrects the coordinate data by reducing the coordinate data after the thickening process by said process means and by enlarging the coordinate data after the narrowing process by said process means so that the frame size remains the same after the thickening or narrowing process as before the thickening or narrowing process.

12. A character processing method comprising the steps of:

inputting weight information;

reading coordinate data for a character to be output;

processing the coordinate data read in said reading step by thickening or narrowing the coordinate data based on the weight information input in said inputting step, wherein a frame size of a character to be output is expanded or reduced based on a thickening or narrowing process, respectively;

correcting the frame size of the character to be output so that it remains the same after the thickening or narrowing processing step as before the thickening or narrowing processing step;

size changing step for enlarging or reducing the coordinate data corrected by said correcting step to a size of the character to be output; and generating dot pattern data based on the coordinate data enlarged or reduced by said size changing step.

13. A method according to claim 12, wherein said correcting step corrects the thickened or narrowed coordinate data in accordance with the following equations:

$$X=[(x+Fx) \times Bx]/(Bx+Fx \times 2),$$

and $$Y=[(y+Fy) \times By]/(By+Fy \times 2),$$

where X and Y are horizontal and vertical coordinates after correction, x and y are horizontal and vertical coordinates for which a thickening or narrowing process is performed, Fx and Fy are horizontal and vertical thickening values, and Bx and By are horizontal and vertical widths of an original character frame, respectively.

14. A method according to claim 12, further comprising determining whether the coordinate data read by said reading step form an interior outline or an exterior outline, wherein said processing step thickens or narrows the coordinate data forming the interior outline and the coordinate data forming the exterior outline distinguishably from each other in response to a determination made by said determining step.

15. A method according to claim 12, wherein said processing step thickens or narrows the coordinate data in the vertical direction and the coordinate data in the horizontal direction independently of each other.

16. A method according to claim 12, further comprising outputting the dot pattern data generated by said generating step.

17. A method according to claim 16, wherein said outputting step comprises outputting to a printer.

18. A method according to claim 16, wherein said outputting step comprises outputting to a display.

19. A method according to claim 12, wherein the coordinate data comprises an entire-outline-type outline font data.

20. A method according to claim 12, wherein the coordinate data comprises a stroke-type outline font data.

21. A method according to claim 12, wherein said correcting step further includes correcting the coordinate data thickened or narrowed in said processing step so that the frame size remains the same after the thickening or narrowing process as before the thickening or narrowing process.

22. A method according to claim 21, wherein said correcting step includes correcting the coordinate data by reducing the coordinate data after the thickening process is performed and by enlarging the coordinate data after the narrowing process is performed so that the frame size remains the same after the thickening or narrowing process as before the thickening or narrowing process.

23. A recording medium having recorded thereon a computer implementable code for controlling a character apparatus, which upon execution will cause the character processing apparatus to perform the steps comprising:

inputting weight information;

reading coordinate data for a character to be output;

processing the read coordinate data by thickening or narrowing the coordinate data based on the input weight information, wherein a frame size of a character to be output is expanded or reduced based on a thickening or narrowing process, respectively;

correcting the frame size of the character to be output so that it remains the same after the thickening or narrowing processing step as before the thickening or narrowing processing step;

size changing step for enlarging or reducing the coordinate data corrected in said correcting step to a size of the character to be output; and generating dot pattern data based on the coordinate data enlarged or reduced in said size changing step.

24. A recording medium according to claim 23, wherein said correcting step corrects the thickened or narrowed coordinate data in accordance with the following equations:

$$X=[(x+Fx) \times Bx]/(Bx+Fx \times 2),$$

and $$Y=[(y+Fy) \times By]/(By+Fy \times 2),$$

where X and Y are horizontal and vertical coordinates after correction, x and y are horizontal and vertical coordinates for which a thickening or narrowing process is performed, Fx and Fy are horizontal and vertical thickening values, and Bx and By are horizontal and vertical widths of an original character frame, respectively.

25. A recording medium according to claim 23, further comprising determining whether the coordinate data read by said reading step form an interior outline or an exterior outline, wherein said processing step thickens or narrows the coordinate data forming the interior outline and the coordinate data forming the exterior outline distinguishably from each other in response to a determination made by said determining step.

26. A recording medium according to claim 23, wherein said processing step thickens or narrows the coordinate data in the vertical direction and the coordinate data in the horizontal direction independently of each other.

27. A recording medium according to claim 23, further comprising outputting the dot pattern data generated by said generating step.

28. A recording medium according to claim 27, wherein said outputting step comprises outputting to a printer.

29. A recording medium according to claim 27, wherein said outputting step comprises outputting to a display.

30. A recording medium according to claim 23, wherein the coordinate data comprises an entire-outline-type outline font data.

31. A recording medium according to claim 23, wherein the coordinate data comprises a stroke-type outline font data.

32. A recording medium according to claim 23, wherein said correcting step includes further correcting the coordinate data thickened or narrowed in said processing step so that the frame size remains the same after the thickening or narrowing process as before the thickening or narrowing process.

33. A recording medium according to claim 32, wherein said correcting step includes correcting the coordinate data by reducing the coordinate data after the thickening process is performed and by enlarging the coordinate data after the narrowing process is performed so that the frame size remains the same after the thickening or narrowing process as before the thickening or narrowing process.

34. A character processing apparatus comprising:

input means for inputting a parameter for designating an amount by which a character is to be thickened or narrowed;

process means for thickening or narrowing an outline of a character, represented by coordinate data, based on the parameter input by said input means;

adjustment means for adjusting the coordinate data of the character outline by reducing the coordinate data after a thickening process by said process means and by enlarging the coordinate data after a narrowing process by said process means such that a frame size of the character remains the same after the thickening or narrowing process as before the thickening or narrowing process; and generation means for generating a character pattern based on the coordinate data adjusted by said adjustment means.

35. An apparatus according to claim 34, wherein said process means thickens or narrows the coordinate data in a direction in which an angle formed by vector AB and vector BC is divided, where A, B, and C are coordinate data on the outline, where B represents coordinate data to be moved in the thickening or narrowing process, and A and C represent coordinate data adjacent to the coordinate B.

36. An apparatus according to claim 34, wherein the parameter input by said input means designates an amount by which the character is thickened or narrowed in horizontal and vertical directions, and said process means thickens or narrows the coordinate data in the horizontal and vertical directions.

37. An apparatus according to claim 34, further comprising output means for outputting the character pattern generated by said generation means.

38. An apparatus according to claim 37, wherein said output means comprises a display.

39. An apparatus according to claim 37, wherein said output means comprises a printer.

40. A method for a character processing apparatus, said method comprising the steps of:

inputting a parameter for designating an amount by which a character is to be thickened or narrowed;

thickening or narrowing an outline of a character, represented by coordinate data, based on the input parameter;

adjusting the coordinate data of the character outline by reducing the coordinate data after the thickening step is performed and by enlarging the coordinate data after the narrowing step is performed such that a frame size of the character remains the same after the thickening or narrowing step as before the thickening or narrowing step; and generating a character pattern based on the adjusted coordinate data.

41. A method according to claim 40, wherein the coordinate data is thickened or narrowed, in said thickening or narrowing step, in a direction in which an angle formed by vector AB and vector BC is divided, where A, B, and C are coordinate data on the outline, where B represents coordinate data to be moved in the thickening or narrowing step, and A and C represent coordinate data adjacent to the coordinate B.

42. A method according to claim 40, wherein the input parameter designates an amount by which the character is thickened or narrowed in horizontal and vertical directions, and the coordinate data is thickened or narrowed in the horizontal and vertical directions in said thickening or narrowing step.

43. A method according to claim 40, further comprising the step of outputting the generated character pattern.

44. A method according to claim 43, wherein the generated character pattern is output to a display.

45. A method according to claim 43, wherein the generated character pattern is output to a printer.

46. A storage medium storing computer readable program instructions for controlling, when executed, a character processing apparatus, the instructions comprising:

instructions for receiving a parameter for designating an amount by which a character is to be thickened or narrowed;

instructions for thickening or narrowing an outline of a character, represented by coordinate data, based on the parameter;

instructions for adjusting the coordinate data of the character outline by reducing the coordinate data after the thickening process is performed and by enlarging the coordinate data after the narrowing process is performed such that a frame size of the character remains the same after the thickening or narrowing process as before the thickening or narrowing process; and instructions for generating a character pattern based on the adjusted coordinate data.

47. A storage medium according to claim 46, wherein the coordinate data is thickened or narrowed, by said instructions for thickening or narrowing, in a direction in which an angle formed by vector AB and vector BC is divided, where A, B, and C are coordinate data on the outline, and where B represents coordinate data to be moved in the thickening or narrowing process, and A and C represent coordinate data adjacent to the coordinate B.

48. A storage medium according to claim 46, wherein the parameter designates an amount by which the character is thickened or narrowed in horizontal and vertical directions, and the coordinate data is thickened or narrowed in the horizontal and vertical directions by said instructions for thickening or narrowing.

49. A storage medium according to claim 46, further comprising instructions for outputting the generated character pattern.

50. A storage medium according to claim 49, wherein the generated character pattern is output to a display.

51. A storage medium according to claim 49, wherein the generated character pattern is output to a printer.

* * * * *

UNITED STATES PATENT AND TRADEMARK OFFICE
CERTIFICATE OF CORRECTION

PATENT NO. : 5,959,634
DATED : September 28, 1999
INVENTOR(S) : Masayuki Yoshida It is certified that error appears in the above-identified patent and that said Letters Patent is hereby corrected as shown below:

<u>Title page,</u>
Item [56], References Cited, U.S. PATENT DOCUMENTS, insert
-- 5,398,311     3/1995     Seto …….. 395/151 --.
FOREIGN PATENT DOCUMENTS, "0451425A2" should read -- 0451125A2 --;
insert -- 94898A1     5/1994     EPO --; and insert
-- 0454125A2     10/1991     European Pat. Off. --.

Signed and Sealed this

Sixth Day of January, 2004

JAMES E. ROGAN
*Director of the United States Patent and Trademark Office*